US010620479B2

(12) United States Patent
Saitoh et al.

(10) Patent No.: US 10,620,479 B2
(45) Date of Patent: Apr. 14, 2020

(54) OPTICAL FILM AND METHOD OF PRODUCING SAME

(71) Applicant: FUJIFILM Corporation, Tokyo (JP)

(72) Inventors: Yukito Saitoh, Kanagawa (JP); Daisuke Kashiwagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/453,007

(22) Filed: Jun. 26, 2019

(65) Prior Publication Data

US 2019/0317352 A1 Oct. 17, 2019

Related U.S. Application Data

(63) Continuation of application No. PCT/JP2017/046036, filed on Dec. 21, 2017.

(30) Foreign Application Priority Data

Dec. 27, 2016 (JP) .................................. 2016-252823

(51) Int. Cl.
*G02F 1/13357* (2006.01)
*G02F 1/1335* (2006.01)

(52) U.S. Cl.
CPC .... *G02F 1/13362* (2013.01); *G02F 1/133528* (2013.01); *G02F 1/133617* (2013.01); *G02F 2001/133543* (2013.01)

(58) Field of Classification Search
None
See application file for complete search history.

(56) References Cited

U.S. PATENT DOCUMENTS 6,061,108 A * 5/2000 Anderson ............ G02B 5/3016
349/115
6,072,549 A * 6/2000 Faris ...................... B82Y 15/00
349/16
6,072,629 A * 6/2000 Fan ...................... G02B 5/3083
359/489.07

(Continued)

FOREIGN PATENT DOCUMENTS

JP      09-133810 A      5/1997
JP      2002-341126 A    11/2002

(Continued)

OTHER PUBLICATIONS

International Search Report issued in PCT/JP2017/046036 dated Feb. 6, 2018.

(Continued)

*Primary Examiner* — Ryan Crockett
(74) *Attorney, Agent, or Firm* — Edwards Neils LLC; Jean C. Edwards, Esq.

(57) ABSTRACT

The optical film is an optical film including a cholesteric liquid crystal layer, in which first regions having a first film thickness and second regions having a second film thickness which is smaller than the first film thickness are alternately arranged with a period P of 0.5 μm to 2.0 μm in at least one direction in a plane, a difference in film thickness between the first film thickness and the second film thickness is in a range of 0.2 μm to 1.0 μm, and a helical pitch of a cholesteric phase in the first region is different from a helical pitch of a cholesteric phase in the second region.

11 Claims, 6 Drawing Sheets

(56) References Cited

U.S. PATENT DOCUMENTS

| | | | | |
|---|---|---|---|---|
| 6,103,323 A * | 8/2000 | Motomura | ............... | C08F 20/36 252/299.01 |
| 9,372,295 B2 * | 6/2016 | Chang | ................... | G02B 5/3016 |
| 10,414,196 B1 * | 9/2019 | Jiang | ......................... | G03F 1/50 |
| 2009/0059158 A1 * | 3/2009 | Umeya | ................ | G02B 5/0236 349/193 |
| 2011/0019111 A1 * | 1/2011 | Morikawa | ......... | G02F 1/133371 349/2 |
| 2011/0122358 A1 * | 5/2011 | Kim | ................. | G02F 1/133371 349/156 |
| 2011/0199685 A1 * | 8/2011 | Ito | ............................ | B32B 3/30 359/589 |
| 2011/0221787 A1 * | 9/2011 | Choi | .................... | G09G 3/2074 345/690 |
| 2015/0331287 A1 * | 11/2015 | Wu | ................... | G02F 1/133753 349/127 |
| 2017/0261666 A1 * | 9/2017 | Anzai | ...................... | A47G 1/00 |
| 2019/0170919 A1 * | 6/2019 | Saitoh | .................. | G02B 3/0056 |
| 2019/0391479 A1 * | 12/2019 | Katoh | ...................... | G02B 5/26 |

FOREIGN PATENT DOCUMENTS

| | | |
|---|---|---|
| JP | 2003-139942 A | 5/2003 |
| JP | 2005-096177 A | 4/2005 |
| JP | 2008-268724 A | 11/2008 |
| JP | 2015-116509 A | 6/2015 |
| WO | 2016/088708 A1 | 6/2016 |

OTHER PUBLICATIONS

Written Opinion issued in PCT/JP2017/046036 dated Feb. 6, 2018.
International Preliminary Report on Patentability completed by WIPO dated Jul. 2, 2019 in connection with International Patent Application No. PCT/JP2017/046036.

* cited by examiner

OPTICAL FILM AND METHOD OF PRODUCING SAME

CROSS-REFERENCE TO RELATED APPLICATIONS

This application is a continuation application of International Application No. PCT/JP2017/046036, filed Dec. 21, 2017, which was published under Article 21(2) in Japanese, and which claims priority under 35 U.S.C. § 119(a) to Japanese Patent Application No. 2016-252823, filed Dec. 27, 2016. The above applications are hereby expressly incorporated by reference, in their entirety, into the present application.

BACKGROUND OF THE INVENTION

1. Field of the Invention

The present invention relates to an optical film comprising a cholesteric liquid crystal layer, and a method of producing the same.

2. Description of the Related Art

Cholesteric liquid crystals have properties of selectively reflecting specific circularly polarized light having a specific wavelength and transmitting other wavelengths and circularly polarized light and have been used for color filters or bright enhancement films of display devices.

Further, a technique of utilizing a cholesteric liquid crystal layer for an identification medium is also known (JP2015-116509A). JP2015-116509A suggests a simple and highly productive production method of forming a hologram layer, whose surface used for displaying holograms has an uneven shape, with a cholesteric liquid crystal compound.

Meanwhile, JP2008-268724A discloses an example of applying a cholesteric liquid crystal layer to a reflective diffraction polarizer. JP2008-268724A suggests a reflective diffraction polarizer having a birefringent film which is formed of a cholesteric liquid crystal layer and has an uneven diffraction grating structure.

SUMMARY OF THE INVENTION

The cholesteric liquid crystal layer selectively reflects light having a wavelength corresponding to the period of a helical structure of a liquid crystal, but the selective reflection wavelength varies depending on the incidence angle of light. Specifically, in the cholesteric liquid crystal layer, a selective reflection wavelength in a case where light is incident from an oblique direction is further shifted to a short wavelength side than a selective reflection wavelength in a case where light is incident from a front direction. For example, the cholesteric liquid crystal layer appears to be green in a front direction, but appears to be blue in an oblique direction.

The present invention has been made in consideration of the above-described circumstances, and an object thereof is to provide an optical film in which a wavelength shift dependent on a viewing angle in a cholesteric liquid crystal layer is suppressed.

According to the present invention, there is provided an optical film comprising: a cholesteric liquid crystal layer, in which the cholesteric liquid crystal layer is formed such that first regions having a first film thickness and second regions having a second film thickness which is smaller than the first film thickness are alternately arranged with a period P of 0.5 μm to 2.0 μm in at least one direction in a plane, a difference in film thickness between the first film thickness and the second film thickness is in a range of 0.2 μm to 1.0 μm, and a helical pitch of a cholesteric liquid crystal in the first region is different from a helical pitch of a cholesteric liquid crystal in the second region.

In the optical film of the present invention, in a case where the helical pitch in the first region is set as $p_1$ and the helical pitch in the second region is set as $p_2$, it is preferable that $p_1$ and $p_2$ have a relationship of $p_1 \times 0.80 \leq p_2 \leq p_1 \times 0.95$.

In the optical film of the present invention, it is preferable that each of widths of the first region and the second region in the direction in which the first regions and the second regions are alternately arranged is half the period P.

In the optical film of the present invention, it is preferable that the number of rotations of the helix of the cholesteric liquid crystal in the first region is the same as the number of rotations of the helix of the cholesteric liquid crystal in the second region.

In the optical film of the present invention, it is preferable that the cholesteric liquid crystals in the first region and the second region are formed of the same material.

It is preferable that the optical film of the present invention further comprises an optically isotropic layer provided on an uneven surface of the cholesteric liquid crystal layer which is generated due to the difference in film thickness between the first region and the second region.

In the optical film of the present invention, it is preferable that a refractive index of the optically isotropic layer is in a range of 1.4 to 1.7.

In the optical film of the present invention, it is preferable that the first regions and the second regions have the same stripe shape and are alternately arranged in a width direction of the stripe shape.

In the optical film of the present invention, it is preferable that the first regions and the second regions have the same rectangular shape and are alternately arranged vertically and horizontally.

According to the present invention, there is provided a method of producing the optical film, which forms a cholesteric liquid crystal layer including first regions having a first film thickness that correspond to opening portions of a mask and second regions having a second film thickness smaller than the first film thickness that correspond to non-opening portions, the method comprising: a coating step of uniformly coating a support with a polymerizable liquid crystal composition which contains a polymerizable liquid crystal compound containing a cationic polymerization group and a photoradical polymerization group, a chiral agent, and a cationic polymerization initiator to form a coated film; an aging step of aligning a liquid crystal in a cholesteric phase in the coated film; a first entire surface exposure step of irradiating an entire surface of the coated film aligned in the cholesteric phase with ultraviolet rays to cause a photocationic polymerization reaction, and curing a part of the coated film to obtain a liquid crystal semi-fixed film; an initiator coating step of coating a surface of the liquid crystal semi-fixed film with an initiator supply liquid containing a photoradical polymerization initiator; a mask exposure step of irradiating the liquid crystal semi-fixed film with ultraviolet rays through a mask having non-opening portions and opening portions which are alternately arranged in at least one direction in a plane with a period P of 0.5 μm to 2.0 μm in a state in which the mask is positioned on the liquid crystal semi-fixed film; a second entire surface exposure step of peeling off the mask from the liquid crystal semi-fixed film and irradiating an entire surface of the liquid crystal semi-fixed film with ultraviolet rays to form an ultraviolet cured film; and a heat treatment step of performing a heat treatment on the ultraviolet cured film.

In the method of producing the optical film of the present invention, it is preferable that the polymerizable liquid crystal composition contains a polymerizable liquid crystal compound represented by Formula (1).

$$Q\text{-}Sp^1\text{-}L^1\text{-}M^1\text{-}L^2\text{-}Sp^2\text{-}Ox \qquad (1)$$

In Formula (1), Q represents a polymerizable group; any one of $Sp^1$ or $Sp^2$ represents branched alkylene or alkylene containing at least one divalent linking group selected from the group consisting of —O—, —C≡C—, and —S— in a chain, and the other represents linear alkylene; $L^1$ and $L^2$ each independently represent a divalent linking group; $M^1$ represents a mesogenic group containing at least one divalent group selected from the group consisting of divalent groups represented by Formulae (2-1) to (2-12); and Ox represents a group represented by Formula (3).

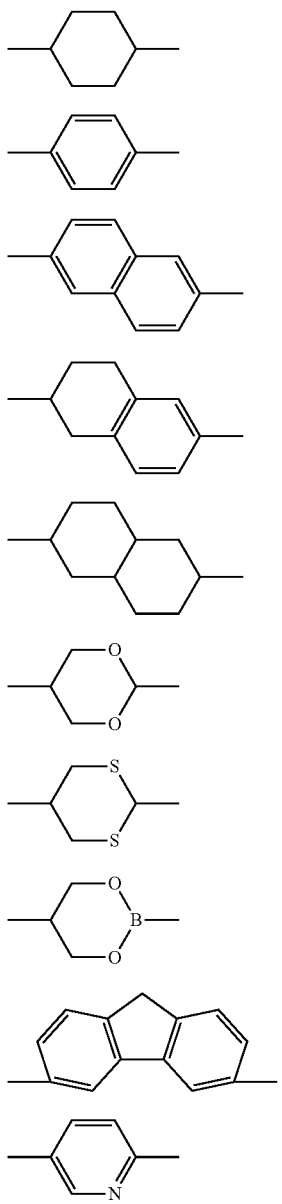

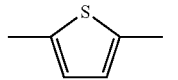

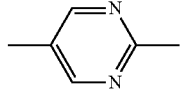

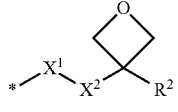

Formula (3)

In Formula (3), $R^2$ represents a hydrogen atom, a methyl group, or an ethyl group, $X^1$ represents —O—, —S—, —OCO—, or —COO—, $X^2$ represents a single bond or alkylene having 1 to 4 carbon atoms, and the symbol "*" represents a bonding site with respect to $Sp^2$.

The optical film of the present invention is an optical film including a cholesteric liquid crystal layer, in which the cholesteric liquid crystal layer is formed such that first regions having a first film thickness and second regions having a second film thickness which is smaller than the first film thickness are alternately arranged with a period P of 0.5 μm to 2.0 μm in at least one direction in a plane, a difference in film thickness between the first film thickness and the second film thickness is in a range of 0.2 μm to 1.0 μm, and a helical pitch of a cholesteric liquid crystal in the first region is different from a helical pitch of a cholesteric liquid crystal in the second region. Further, the optical film of the present invention is an optical film that reflects a circularly polarized light component in a selective reflection wavelength region comprising the cholesteric liquid crystal layer, in which only a specific wavelength can be output by allowing light incident on the first region and reflected to interfere with light incident on the second region and reflected. Therefore, a wavelength shift in a case of visual recognition in an oblique direction can be suppressed.

DESCRIPTION OF THE PREFERRED EMBODIMENTS

Hereinafter, a first optical film according to an embodiment of the present invention will be described with reference to the accompanying drawings. Further, in each drawing, in order to facilitate visual recognition, the scales of constituent elements are appropriately changed from the actual scales thereof.

<Optical Film>

Figure 1:
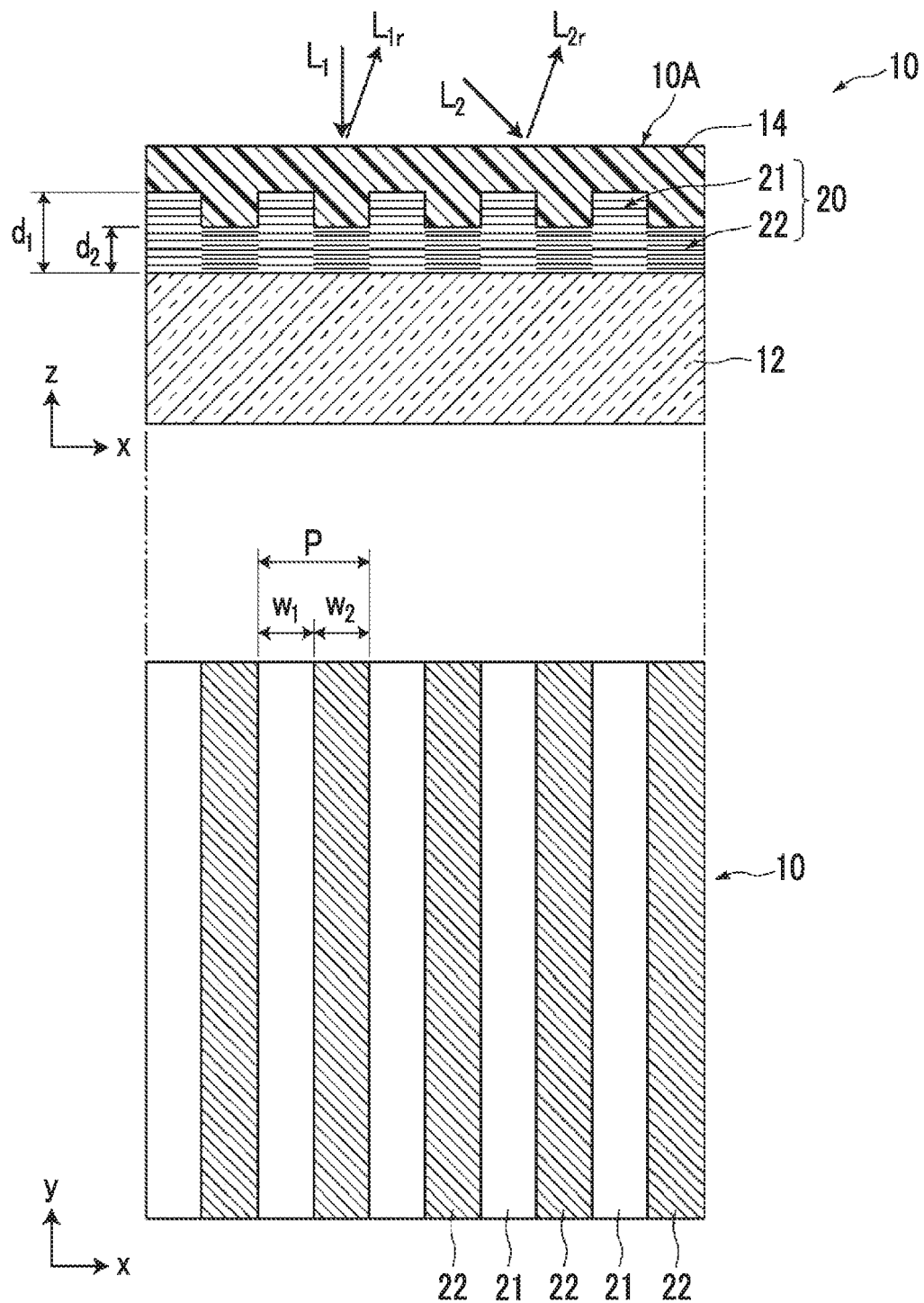
FIG. 1 is a cross-sectional and plan view schematically illustrating an optical film according to a first embodiment.

FIG. 1 is a schematic cross-sectional and plan view illustrating an optical film 10 according to a first embodiment of the present invention. The optical film 10 according to the present embodiment of the present invention comprises a cholesteric liquid crystal layer 20 having a surface with unevenness on a support 12. The cholesteric liquid crystal layer 20 is formed such that first regions 21 having a first film thickness $d_1$ and second regions 22 having a second film thickness $d_2$ which is smaller than the first film thickness $d_1$ are alternately arranged with a period P of 0.5 µm to 2.0 µm in at least one direction (an x direction in the figure) in a plane. Further, in the cholesteric liquid crystal layer 20, a difference $d_1-d_2$ in film thickness between the first film thickness $d_1$ and the second film thickness $d_2$ is in a range of 0.2 µm to 1.0 µm, and a helical pitch (hereinafter, also simply referred to as a "pitch") of a cholesteric phase in the first region 21 is different from a helical pitch of a cholesteric phase in the second region 22. The cholesteric liquid crystal layer 20 has unevenness on the surface thereof due to the difference in thickness between the first region 21 and the second region 22.

In the present embodiment, the optical film comprises an optically isotropic layer 14 provided for embedding the uneven surface of the cholesteric liquid crystal layer 20. The optical film 10 has a flat surface because the unevenness of the cholesteric liquid crystal layer 20 is eliminated by the optically isotropic layer 14. Further, the optical film according to the embodiment of the present invention may or may not comprise the optically isotropic layer. However, from the viewpoint that an absolute phase can be adjusted, it is preferable that the optical film comprises the optically isotropic layer.

The optically isotropic layer 14 is a layer having optical isotropy and has an optical characteristic in which a polarized state of light to pass therethrough is not affected.

The optical film 10 reflects a specific circularly polarized light component in a selected wavelength range due to the cholesteric liquid crystal layer 20 among light beams incident from a surface 10A on the uneven surface side of the cholesteric liquid crystal layer 20, that is, the optically isotropic layer 14 side in the present example. Here, the specific circularly polarized light component is a right circularly polarized light or left circularly polarized light component, and polarized light to be selected from the light beams is determined by the winding direction of the helix of the cholesteric liquid crystal layer 20.

Figure 2:
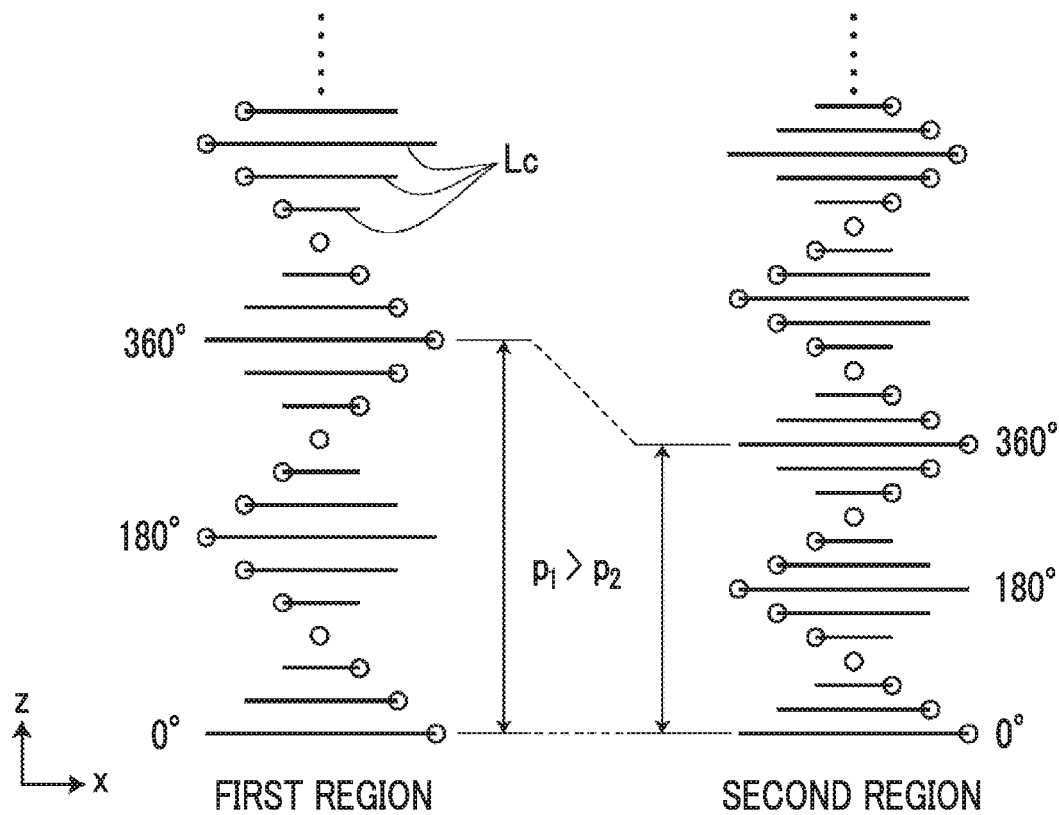
FIG. 2 is a schematic view for describing helical pitches in a cholesteric structure.

The cholesteric liquid crystal layer 20 is a layer aligned in a cholesteric phase in which rod-like liquid crystal molecules or disk-like liquid crystal molecules are helically arranged. FIG. 2 is a view schematically illustrating a cholesteric structure formed of rod-like liquid crystal molecules Lc in the first region 21 and second region 22 of the cholesteric liquid crystal layer 20. In FIG. 2, a circle is drawn in one end of each rod-like liquid crystal molecule Lc in order to show the alignment state of the rod-like liquid crystal molecule Lc. In a case where the position in the thickness direction (an arrow z direction in the figure) is shifted, the rod-like liquid crystal molecule Lc gradually rotates in an xy plane, and the thickness until the molecule returns to the original state after rotating 360° is set as a helical pitch p. In the present invention, a pitch $p_1$ of the first region is different from a pitch $p_2$ of the second region. In the example illustrated in FIGS. 1 and 2, the pitch $p_1$ of the first region is greater than the pitch $p_2$ of the second region. Further, from the viewpoints of generating a difference in absolute phase between reflected light beams and causing phase interference, it is preferable that the pitch $p_1$ of the first region and the pitch $p_2$ of the second region have a relationship of "$p_1 \times 0.80 \leq p_2 \leq p_1 \times 0.95$".

The relationship between a selective reflection center wavelength λc and a helical pitch p in a case where light is incident (incident at an incidence angle of 0°) perpendicularly to the cholesteric liquid crystal layer 20 is represented by $\lambda_c = p/n$ (n represents a refractive index). In other words, the expression of "the helical pitch in the first region 21 is different from the helical pitch in the second region 22" indicates that the selective reflection center wavelength of the first region 21 is different from the selective reflection center wavelength of the second region 22. Here, the reflection center wavelength of the first region 21 is larger than the selective reflection center wavelength of the second region 22.

From the viewpoints of the phase interference of reflected light in an oblique orientation and influence of the cholesteric liquid crystal layer on the short wavelength shift, the arrangement period P of two regions 21 and 22 may be in a range of 0.5 µm to 2.0 µm, more preferably in a range of 0.5 µm to 1.0 µm, and particularly preferably in a range of 0.6 µm to 0.8 µm.

In the present embodiment, the first regions 21 and the second regions 22 have the same stripe shape and are alternately arranged in the width direction thereof as illustrated in the lower part of FIG. 1. In FIG. 1, a width $w_1$ of the first region 21 in the arrangement direction and a width $w_2$ of the second region 22 in the arrangement direction are the same as each other and are half the arrangement period P ($w_1 = w_2 = P/2$). The width $w_1$ of the region 21 and the width $w_2$ of the region 22 may not be the same as each other. However, it is preferable that the width $w_1$ and the width $w_2$ are equal to each other. Here, the concept of "equal" includes a manufacturing error range of approximately ±10%. In other words, in a case where the width $w_1$ and the width $w_2$ are each in a range of 0.45P to 0.55P with respect to the arrangement period P, the width $w_1$ and the width $w_2$ can be regarded as being equal to 0.5P. Further, in a case where the period, the film thickness, or the like without limiting to the width of this stripe is in a range of ±10% with respect to the design value, the period, the film thickness, or the like can be regarded as being equal to the design value.

Figure 3:
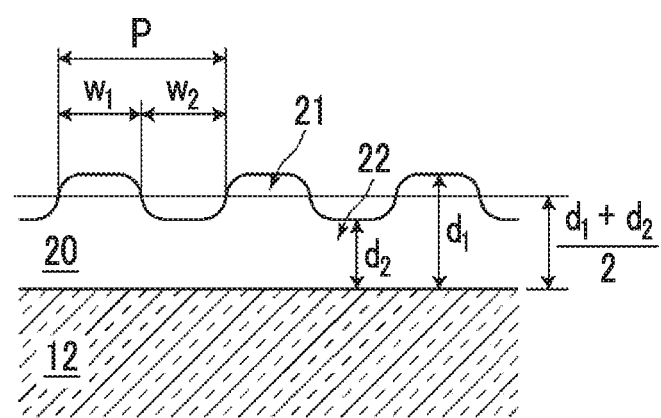
FIG. 3 is a schematic view for describing the film thicknesses, the widths, and the periods of a first region and a second region.

FIG. 1 is a schematic view and illustrates that the boundary between the first region 21 and the second region 22 of the cholesteric liquid crystal layer 20 has a clear rectangular uneven surface, but the boundary of the first region 21 and the second region 22 is practically not clear. In most cases, the corners of the unevenness in the surface are obtuse. FIG. 3 is a view schematically illustrating a cross section of the cholesteric liquid crystal layer 20 in a case where the corners of unevenness are obtuse. In the present invention, the arrangement period, the width, the film thickness, and the like of a region are defined to be measured in the following manner.

The film thickness, the width, and the arrangement period of each region are acquired from a scanning electron microscope (SEM) image of a cross section of the first region and the second region along the arrangement direction. The film thickness $d_1$ of the first region indicates the distance between the interface between the cholesteric liquid crystal layer and a lower layer (a base material or an alignment film described below) and the vertex of a projection. The film thickness $d_2$ of the second region indicates a distance from an interface between the cholesteric liquid crystal layer and the lower layer to the most depressed position of a depression. The film thickness is acquired by measuring a plurality of three or more sites and averaging the values.

The width $w_1$ of the first region and the width $w_2$ of the second region are each set as the distance between intersections of the film thickness line of $(d_1+d_2)/2$ with side walls of a projection (see FIG. 3). Further, the period P indicates $w_1+w_2$.

Further, the period, that is, the helical pitch of the cholesteric liquid crystal can be acquired from the intensity of the SEM image. In other words, the intensity of the SEM resulting from a difference in electron density of liquid crystal molecules depending on whether the observation surface is parallel or orthogonal to the alignment axis of the liquid crystal is shown. "Dark→bright→dark" corresponds to 180 degrees of the twist of the liquid crystal. Typically, rotation of 360 degrees is set as one period of the cholesteric liquid crystal. Since "dark→bright→dark→bright→dark" corresponds to 360 degrees in the SEM image, in a case where the length thereof is measured, the distance (helical pitch) of one period can be obtained. In this manner, the period of the cholesteric liquid crystal is measured.

In a case where the cholesteric liquid crystal layer is a uniform film (the film thickness and the helical pitch are the same over the entire surface), the cholesteric liquid crystal layer shows regular reflection with respect to specific polarized light among incident light beams in a specific wavelength range. Typically, incident light (hereinafter, referred to as front incident light) which is incident perpendicularly from the normal direction is reflected in the normal direction, and incident light at an incidence angle of θ is reflected at a reflection angle of θ. However, the optical film 10 causes a phenomenon in which incident light $L_1$ from the normal direction is reflected as reflected light $L_{1r}$ at an angle inclined from the normal direction and incident light $L_2$ at an incidence angle of θ is reflected at a reflection angle $L_{2r}$ which is smaller than the incidence angle of θ.

The above-described effects are generated based on the following principle. The cholesteric liquid crystal layer has the first regions 21 and the second regions 22, and these first regions 21 and second regions 22 are arranged with a period of 0.5 μm to 2.0 μm. In the optical film 10, a difference in absolute phase occurs between the light incident on the first region 21 and reflected and light incident on the second region 22 and reflected due to the influence of the pattern arrangement of the first regions and the second regions, and the light beams interfere with each other. Therefore, the reflected light beams strengthen or weaken each other depending on the emission direction (reflection angle). As the result, the incident light is reflected at an angle different from the regular reflection direction of the incident light.

The reflection angle at which reflected light from the first region and reflected light from the second region after the incident light is incident thereon weaken each other and the reflection angle at which these reflected light beams strengthen each other are determined by the film thickness and the arrangement period of the first region 21 and the second region 22. In a case where the absolute phase of the reflected light from the first region and the absolute phase of the reflected light from the second region which is reflected at the same reflection angle as that of the reflected light from the first region are shifted by π, they cancel each other, and thus the reflected light becomes dark. In addition, in a case where the absolute phase of the reflected light from the first region and the absolute phase of the reflected light from the second region which is reflected at the same reflection angle as that of the reflected light from the first region match each other, the reflected light becomes bright. The optical film according to the embodiment of the present invention has a configuration obtained by employing this principle. In the cholesteric liquid crystal layer, in a case where the helical pitches are different from each other, the absolute phases of the reflected light are shifted from each other even though the film thicknesses are the same as each other. Further, in a case where the film thicknesses are different from each other even though the helical pitches are the same as each other, the absolute phases are shifted from each other by a change in thickness. In other words, the amount of the absolute phase to be shifted is determined depending on the helical pitches and the film thicknesses of the first region 21 and the second region 22.

The cholesteric liquid crystal layer in the optical film according to the embodiment of the present invention is capable of effectively causing a shift in absolute phase because the film thicknesses of the first region and the second region are different from each other and the helical pitches between both regions are different from each other. Due to this shift in absolute phase, it is possible to allow the reflected light from the first region 21 and the reflected light from the second region 22 to interfere with each other, to control the color to be observed as the reflected light as the result of the interference, and to effectively obtain the characteristic in which the color is not changed obliquely.

In the optical film 10, the reflected light beams interfere with each other such that the front reflection is weakened and the oblique reflection at a specific reflection angle is strengthened with respect to the front incident light, and the oblique reflection at a specific reflection angle is weakened and the front reflection is strengthened with respect to oblique incidence at a specific incident angle. In this manner, the reflected light of the front incident light is shifted to a short wavelength so that an effect of suppressing a short wavelength shift of the reflected light of the oblique incident light can be obtained. Therefore, in a case of visual recognition from the front side, an effect of suppressing the shift amount of the wavelength in a case of visual recognition in an oblique direction can be obtained.

The influence of the short wavelength shift due to the cholesteric liquid crystal layer becomes higher as the reflection angle of the reflected light is increased. Therefore, in order to suppress the shift amount of the wavelength, it is necessary to simultaneously consider the application of the theory for interference and the degree of short wavelength shift in a case of oblique light of the cholesteric liquid crystal layer so that the reflection center wavelength at the time of oblique reflection of the front incident light and the reflection center wavelength at the time of front reflection of the oblique incident light are as close as possible. According to the examination conducted by the present inventors, in order for the reflection center wavelength at the time of oblique reflection of the front incident light and the reflection center wavelength at the time of front reflection of the oblique incident light to be as close as possible, it is preferable that the difference in film thickness is in a range of 0.2 μm to 1 μm and the helical pitches have a relationship of "$p_1 \times 0.80 \leq p_2 \leq p_1 \times 0.95$". In a case where the difference and the helical pitches are each in the above-described range, it is possible to suppress the front reflection of the front incident light, strengthen the reflected light at a specific reflection angle, and also strengthen the front reflected light of the obliquely incident light. As the result, since the reflection wavelength of the front incident light and the reflection wavelength of the incident light are allowed to approach each other and become the same as each other so that the short wavelength shift of the reflected light can be suppressed, the wavelengths of the strengthened reflected light beams are observed from a surface 10A of the optical film 10.

Therefore, the optical film functions as an optical film which is capable of suppressing the short wavelength shift in a case where the incidence angle of light is increased, compared to a reflective polarizer formed of a uniform cholesteric liquid crystal layer of the related art.

Figure 4:
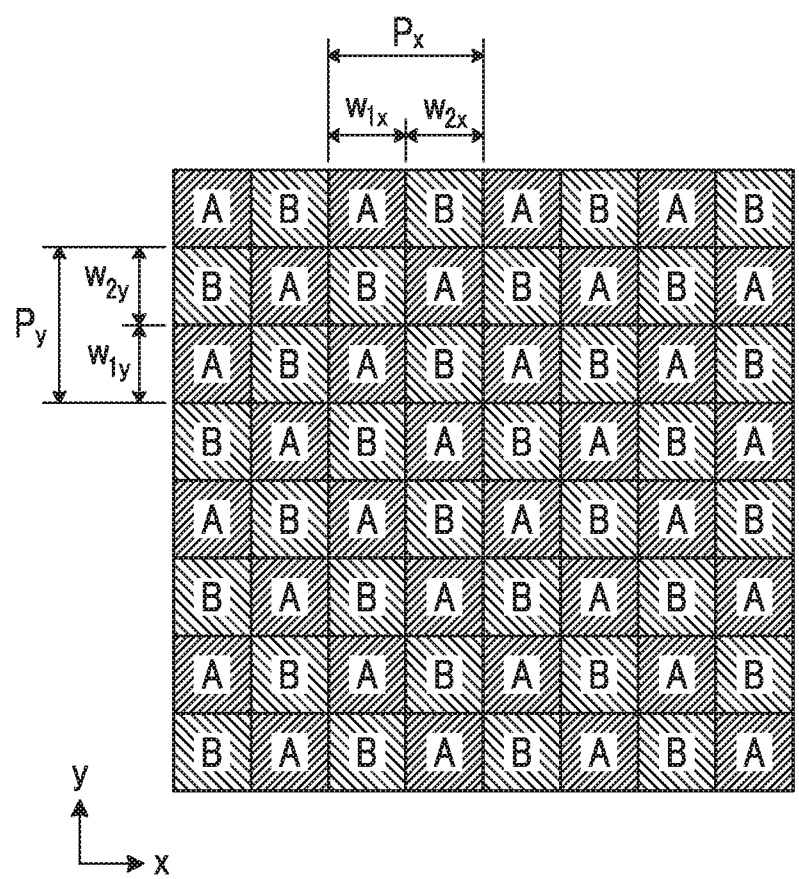
FIG. 4 is a plan view illustrating another example of an arrangement pattern of first regions and second regions of a cholesteric liquid crystal layer (first example).
Figure 5:
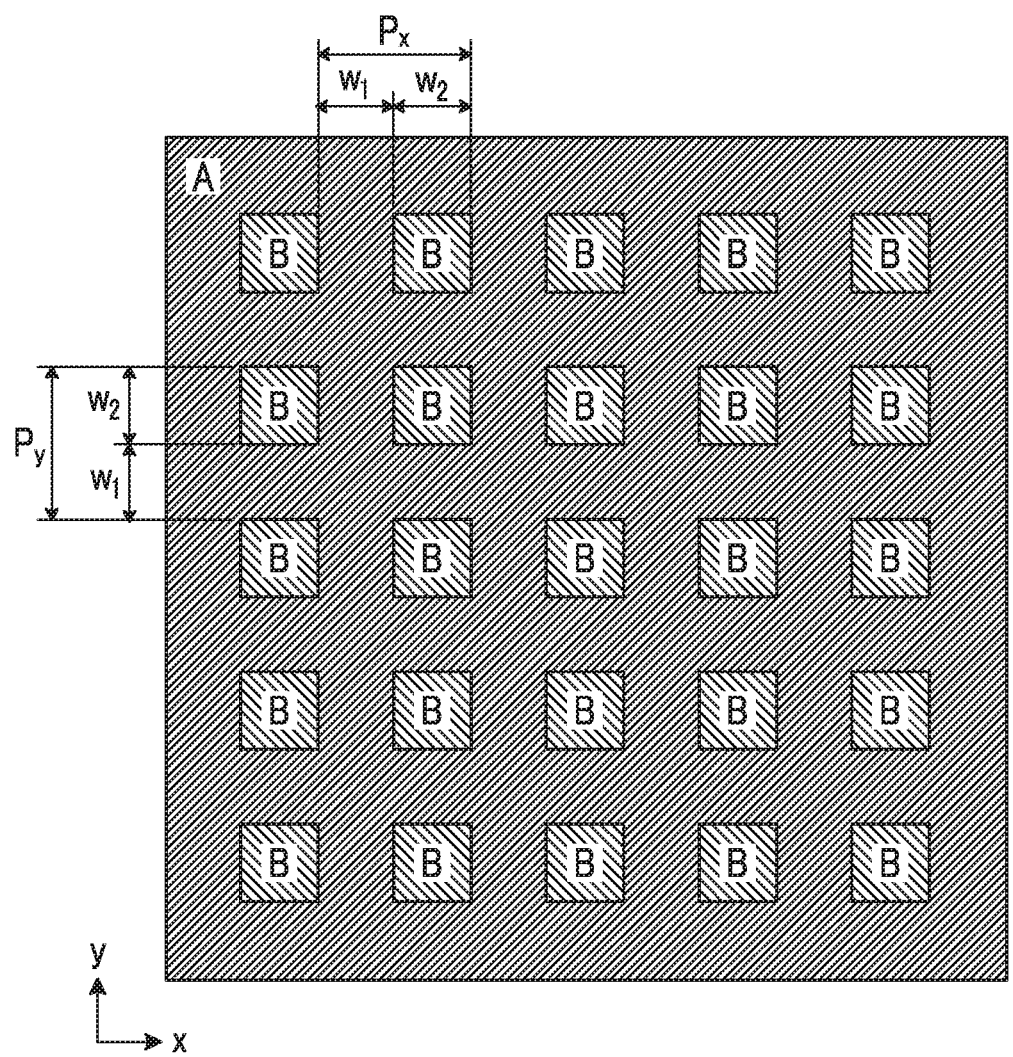
FIG. 5 is a plan view illustrating still another example of an arrangement pattern of first regions and second regions of a cholesteric liquid crystal layer (second example).
Figure 6:
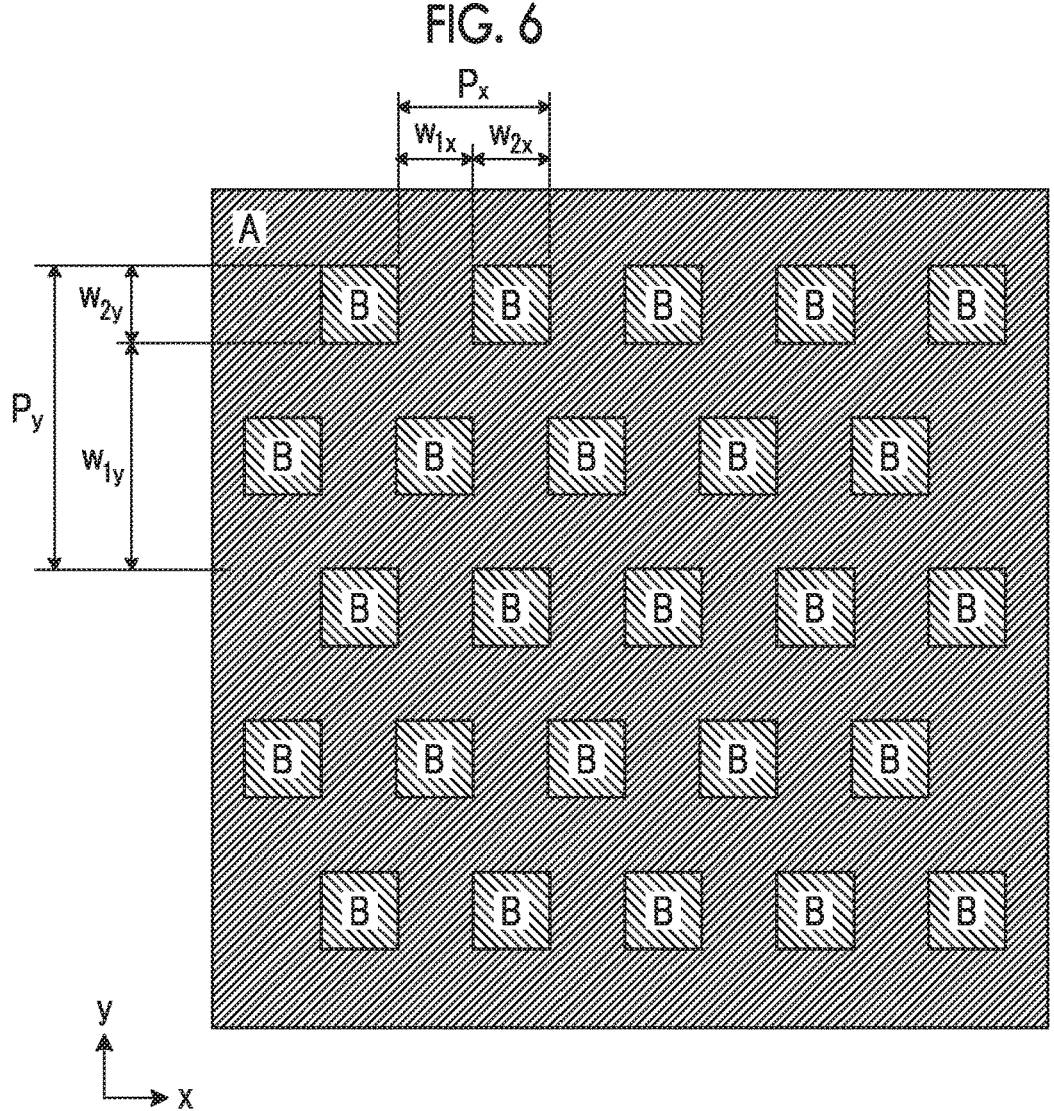
FIG. 6 is a plan view illustrating even still another example of an arrangement pattern of first regions and second regions of a cholesteric liquid crystal layer (third example).

FIGS. 4 to 6 are schematic plan views illustrating examples of the arrangement pattern of the first regions and the second regions of the cholesteric liquid crystal layer in the optical film according to the embodiment of the present invention. In FIGS. 4 to 6, the first region and the second region are respectively shown as A and B.

As illustrated in FIG. 4, the first regions A and the second regions B have the same rectangular shape, and thus an arrangement pattern in which the first regions A and the second regions B are alternately arranged vertically and horizontally (the x and y directions indicated by arrows in the figure). As the rectangular shape, an oblong shape ($w_{1x} \neq w_{1y}$, $w_{2x} \neq w_{2y}$) or a square shape ($w_{1x} = w_{1y}$, $w_{2x} = w_{2y}$) may be employed, but a square shape is more preferable. In a case where the first region A and the second region B have the same square shape ($w_{1x} = w_{1y} = w_{2x} = w_{2y}$), the periods Px and Py of the first region A and the second region B in the vertical direction and the horizontal direction are the same as each other as illustrated in FIG. 4.

As illustrated in FIG. 5, an arrangement pattern in which the second regions B are two-dimensionally and periodically arranged in the first region A may be employed. At this time, the first region A has a portion which is continuously formed, but the second regions B are two-dimensionally arranged in the first region A respectively with a period of Px and a period of Py in the horizontal direction and the vertical direction (the x and y directions indicated by arrows). Further, the period Px and the period Py in the x direction and y direction may be the same as or different from each other, and at least one period may be in a range of 0.5 μm to 2.0 μm. In addition, it is preferable that both of the period Px and the period Py are in a range of 0.5 μm to 2.0 μm.

FIG. 6 illustrates an example in which the second regions B having a square shape are arranged in the first region A with periods of Px and Py which are different from each other in the horizontal direction and the vertical direction. In the example illustrated in FIG. 6, a portion in which the first region A and the second regions B are alternately arranged in the x direction with a period of Px and a portion in which only the first region A is continuously formed are shown. Further, the first region A with a width $w_{1y}$ and the second regions B with a width of $w_{2y}$ are alternately arranged in the y direction with a period of $P_y$.

In a case of the periodic patterns illustrated in FIGS. 5 and 6, the shape of the second region B is not limited to the rectangular shape and may have a polygonal shape, a circular shape, or an elliptical shape. Further, the width of the second region B is defined as the maximum length of the second region B in a direction in which the second regions B and the first region A are alternately arranged.

The arrangement pattern of the first regions A and the second regions B is not limited particularly to the arrangement patterns illustrated in FIGS. 1 and 4 to 6 as long as the arrangement pattern is formed such that the first regions A and the second regions B cause the reflected light from the first regions and the reflected light from the second regions to interfere with each other.

Figure 7:
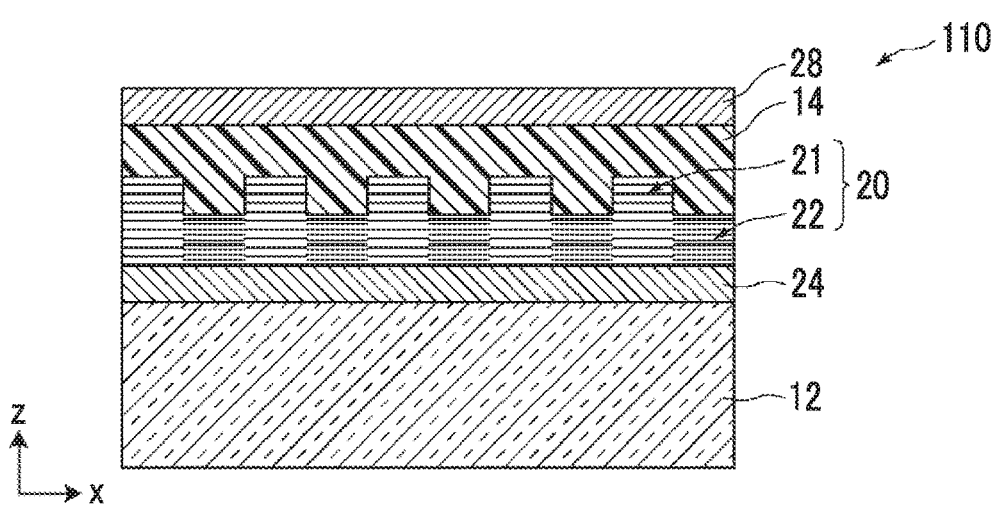
FIG. 7 is a cross-sectional view schematically illustrating an optical film according to a second embodiment.

FIG. 7 is a schematic cross-sectional view illustrating an optical film 110 according to a second embodiment.

The optical film according to the embodiment of the present invention has a configuration in which a cholesteric liquid crystal layer 20 and an optically isotropic layer 14 are laminated on an alignment film 24 provided on one surface of the support 12, as the optical film 110 according to the embodiment illustrated in FIG. 7. Further, a diffusion plate 28 is comprised on the surface of the optically isotropic layer 14.

In a case where the optical film 10 according to the first embodiment is observed from a surface 10A on the uneven surface side of the cholesteric liquid crystal layer 20, bright lines and dark lines are seen as interference light. However, since the optical film 110 comprises the diffusion plate 28, interference light emitted from the uneven surface can be observed as diffused light diffused by the diffusion plate 28.

Each constituent element constituting the optical film according to the embodiment of the present invention will be described.

<Cholesteric Liquid Crystal Layer>

The cholesteric liquid crystal layer is a layer having a liquid crystal phase (cholesteric phase) in which a rod-like liquid crystal compound or a disk-like liquid crystal compound is helically aligned. The reflection center wavelength can be adjusted by changing the pitch or the refractive index of the helical structure in this cholesteric phase. The pitch of this helical structure can be easily adjusted by changing the amount of the chiral agent to be added. The detailed description thereof is available in Fujifilm Research Report No. 50 (2005), p. 60 to 63. Further, the pitch of the helical structure can also be adjusted under conditions of the temperature, the illuminance, and the irradiation time at the time of fixing the cholesteric phase.

(Polymerizable Liquid Crystal Compound)

As a polymerizable liquid crystal composition for forming the cholesteric liquid crystal layer of the present invention, a material having a small contraction rate in a photopolymerization step is used. As such a material, an oxirane compound is exemplified. More specific examples thereof include an epoxy compound and an oxetane compound. An oxirane ring may be contained in a liquid crystal molecule, and a compound containing an oxetane ring and a radically polymerizable group in one molecule at once is exemplified. The present inventors found that in a case where a heat treatment is performed after polymerization carried out through irradiation with ultraviolet rays using such a material, the contraction rate increases as the ultraviolet irradiation amount decreases. Typically, the volume is contracted by photopolymerization carried out through irradiation with ultraviolet rays, and the volume contraction rate increases as the exposure amount increases. However, in a case where a liquid crystal composition in which some radically polymerizable groups are replaced with cationic polymerizable groups such as an oxetane ring is used, the volume contraction rate at the time of polymerization using only a radically polymerizable group is suppressed, compared to a liquid crystal composition containing only a radically polymerizable group. Further, in a case where a polymerizable liquid crystal composition having a small contraction rate in the photopolymerization step is used, the volatilization volume of an unpolymerized liquid crystal compound and the like is increased at the time of the heat treatment particularly in a portion where ultraviolet curing is weak (the ultraviolet exposure amount is small), and the film thickness contraction rate at the time of the heat treatment is further increased than the contraction rate at the time of photopolymerization, and thus the final film thickness is assumed to be decreased particularly in a region where the exposure amount is small.

As the polymerizable liquid crystal composition having a small contraction rate in the photopolymerization step, a composition which contains a polymerizable liquid crystal compound comprising a cationic polymerizable group and a radically polymerizable group, and a chiral agent, and a cationic polymerization initiator is preferable. Further, the composition may further contain other components such as an alignment control agent and an alignment assistant. Particularly a polymerizable liquid crystal composition containing a polymerizable liquid crystal compound described in JP2008-127336A can be suitably used.

—Polymerizable Liquid Crystal Compound—

As the polymerizable liquid crystal compound comprising a cationic polymerizable group and a radically polymerizable group, a polymerizable liquid crystal compound represented by Formula (1) is suitable.

$$Q\text{-}Sp^1\text{-}L^1\text{-}M^1\text{-}L^2\text{-}Sp^2\text{-}Ox \quad (1)$$

In Formula (1), Q represents a polymerizable group. In the present specification, in a case where —CO—, —OCO—, —COO—, and the like are bonded to a polymerizable double bond and the like, a polymerizable group Q is considered as a polymerizable group including —CO—, —OCO—, —COO—, and the like. Here, the polymerizable group Q is a radically polymerizable group. Ox described below represents a cationic polymerizable group. Accordingly, by setting the polymerizable group Q as a radically polymerizable group, the polymerization reaction can proceed under different conditions. As the radically polymerizable group, a (meth)acryloyloxy group or (meth)acryloyl is preferable, and a (meth)acryloyloxy group is more preferable.

In Formula (1), any one of $Sp^1$ or $Sp^2$ represents branched alkylene or alkylene containing at least one divalent linking group selected from the group consisting of —O—, —C≡C—, and —S— in a chain, and the other represents linear alkylene. As described above, in a case where $Sp^1$ and $Sp^2$ have different structures, in other words, asymmetric structures, the solubility in an organic solvent and particularly MEK is improved. Among examples of the branched alkylene or the alkylene which contains at least one divalent linking group selected from the group consisting of —O—, and —S— in a chain, alkylene containing —O— or —C≡C— in a chain is preferable, and —(CH$_2$)$_{n1}$—X—(CH$_2$)$_{n2}$— is more preferable. Here, n1 and n2 each independently represent an integer of 1 to 4 and preferably 1 or 2. —X— is —O— or —C≡C— and preferably —O—. In a case where —X— is —O—, it is preferable that both of n1 and n2 represent 2. In a case where —X— is it is preferable that both of n1 and n2 represent 1. The number of carbon atoms (including the number of carbon atoms in a branched chain) of branched alkylene is preferably in a range of 4 to 12, more preferably in a range of 4 to 8, and still more preferably in a range of 4 to 6. As the branched chain, a methyl group or an ethyl group is preferable, and a methyl group is more preferable.

The number of carbon atoms of the other linear alkylene is preferably in a range of 2 to 12, more preferably in a range of 4 to 8, and still more preferably in a range of 4 to 6. The selection of which one of branched alkylene, alkylene containing at least one divalent linking group selected from the group consisting of —O—, —C≡C—, and —S— in a chain, and linear alkylene matches $Sp^1$ or $Sp^2$ is not particularly limited and can be appropriately determined depending on the applications thereof and the method. In the present invention, since —Ox is polymerized first between polymerizable groups Q and —Ox, it is preferable that $Sp^2$ represents linear alkylene and $Sp^1$ represents branched alkylene or alkylene containing at least one divalent linking group selected from the group consisting of —O—, —C≡C—, and —S— in a chain. As described above, in a case where polymerization is performed in a stepwise manner, since the fluidity at the time of the second polymerization is becomes lower than the fluidity at the time of the first polymerization, the polymerization rate tends to be decreased. In a case where a spacer on the side of a polymerizable group to be polymerized first is branched alkylene or alkylene containing at least one divalent linking group selected from the group consisting of —O—, —C≡C—, and —S— in a chain, thermal fluctuation easily occurs in a mesogen site. As the result, the heat resistance is degraded. Therefore, by setting the spacer on the side of a polymerizable group to be polymerizable first as linear alkylene, thermal fluctuation of the mesogen site is suppressed, and thus the heat resistance is improved.

In Formula (1), $L^1$ and $L^2$ each independently represent a divalent linking group. $L^1$ and $L^2$ are not particularly limited as long as $L^1$ and $L^2$ each represent a group formed by linking $Sp^1$ with $M^1$ and $Sp^2$ with $M^1$ and represent preferably a single bond, —O—, —S—, —OCO—, —COO—, —CO—, —CH$_2$—, —CONH—, or —NHCO—, more preferably a single bond, —O—, —S—, —OCO—, or —COO—, still more preferably a single bond, —O—, or —CH$_2$—, and most preferably —O—. $L^1$ and $L^2$ represent preferably the same divalent linking group and more preferably —O—. In the present specification, in a case where —O— is directly bonded to M', —O— is treated as $L^1$ or $L^2$ and does not constitute $Sp^1$ or $Sp^2$.

In Formula (1), $M^1$ represents a mesogenic group containing at least one divalent group, preferably three or more divalent groups, and more preferably three groups selected from the group consisting of divalent groups represented by Formulae (2-1) to (2-12).

(2-1)

(2-2)

(2-3)

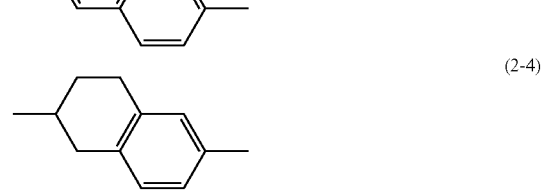

(2-4)

-continued

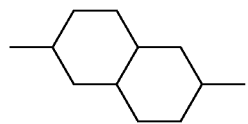
(2-5)

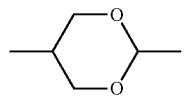
(2-6)

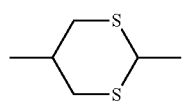
(2-7)

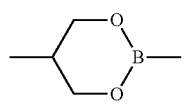
(2-8)

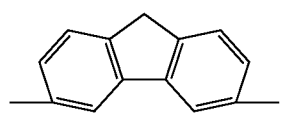
(2-9)

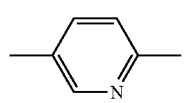
(2-10)

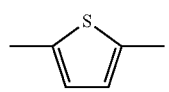
(2-11)

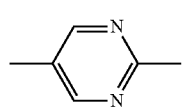
(2-12)

For example, a divalent group represented by Formula (2-1) is an unsubstituted 1,4-cyclohexylene group, and a divalent group represented by Formula (2-2) is an unsubstituted 1,4-phenylene group.

In a case where the mesogenic group represented by $M^1$ is formed of two or more of the above-described groups, the above-described groups may be bonded by a linking group selected from the group consisting of a single bond, an acetylene group (—C≡C—), —N=N—, —N=CH—, —C(CN)=CH—, —CONHCONHCO—, —O—, —S—, —OCO—, —COO—, —OCOO—, —CO—, —CH$_2$—, —OCH$_2$—, —CH$_2$O—, —CONH—, —NHCO—, —NHCOO—, and —OCONH—, preferably bonded by a linking group selected from the group consisting of a single bond, an acetylene group (—C≡C—), —OCO—, —COO—, —OCH$_2$—, —CH$_2$O—, —N=N—, —N=CH—, —C(CN)=CH—, —CONH—, —NHCO—, and —CONHCONHCO—, and more preferably bonded by a linking group selected from the group consisting of a single bond, an acetylene group (—C≡C—), —OCO—, —COO—, —CONH—, and —NHCO—.

In Formula (1), Ox represents a group represented by Formula (3).

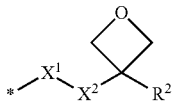
Formula (3)

In Formula (3), $R^2$ represents a hydrogen atom, a methyl group, or an ethyl group, preferably a methyl group or an ethyl group, and more preferably a methyl group. $X^1$ represents —O—, —S—, —OCO—, or —COO—, preferably —O— or —OCO— (an Ox side is O and an Sp side is CO), and more preferably —O—. $X^2$ represents a single bond or alkylene having 1 to 4 carbon atoms, preferably alkylene having 1 or 2 carbon atoms, and more preferably alkylene (methylene) having 1 carbon atom. Further, the symbol "*" represents a bonding site with respect to $Sp^2$.

Further, specific examples of the polymerizable liquid crystal compound represented by Formula (1) are described in JP2008-127336A, and these can be appropriately used. The concentration of the polymerizable liquid crystal compound in the polymerizable liquid crystal composition is preferably in a range of 30% by mass to 99.9% by mass, more preferably in a range of 50% by mass to 99.9% by mass, and still more preferably in a range of 70% by mass to 99.9% by mass with respect to the total mass of the composition.

—Chiral Agent (Optically Active Composition)—

A chiral agent has a function of inducing a helical structure of a cholesteric liquid crystalline phase. The chiral agent may be selected depending on the purpose thereof because the helical sense or the helical pitch induced by a compound varies.

The chiral agent is not particularly limited, and known compounds (for example, Liquid Crystal Device Handbook, section 4-3 in Chapter 3, chiral agent for TN and STN, p. 199, edited by Japan Society for the Promotion of Science, 142th Committee, 1989), isosorbide, and isomannide derivative can be used.

The chiral agent typically contains asymmetric carbon atoms, but an axially asymmetric compound or planarly asymmetric compound that does not contain asymmetric carbon atoms can also be used as a chiral agent. Examples of the axially asymmetric compound and the planarly asymmetric compound include binaphthyl, helicene, paracyclophane, and derivatives of these. The chiral agent may contain a polymerizable group. In a case where both of the chiral agent and the liquid crystal compound contain a polymerizable group, a polymer having a repeating unit derived from a polymerizable liquid crystal compound and a repeating unit derived from a chiral agent can be formed by the polymerization reaction between the polymerizable chiral agent and the polymerizable liquid crystal compound. In this form, it is preferable that the polymerizable group contained in the polymerizable chiral agent is the same group as the polymerizable group contained in the polymerizable liquid crystal compound. Therefore, as the polymerizable group of the chiral agent, an unsaturated polymerizable group, an epoxy group, or an aziridinyl group is preferable, an unsaturated polymerizable group is more preferable, and an ethylenically unsaturated polymerizable group is particularly preferable.

Further, the chiral agent may be a liquid crystal compound.

It is preferable that the chiral agent contains a photoisomerizable group because a pattern of a desired reflection wavelength corresponding to an emission wavelength can be formed by photomask irradiation using actinic rays or the like after application and alignment. As the photoisomerizable group, an isomerizable site of a compound exhibiting photochromic properties, an azo group, an azoxy group, or a cinnamoyl group is preferable. Specific examples of such compounds are described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A, and these compounds can be used.

The content of the chiral agent in the polymerizable liquid crystal composition is preferably in a range of 0.01% by mole to 200% by mole and more preferably in a range of 1% by mole to 30% by mole with respect to the total amount of the polymerizable liquid crystal compound.

—Cationic Initiator (Photocationic Generator)—

A photocationic generator is not limited as long as the agent has a function of generating an acid by irradiation with light and initiating cationic polymerization of an oxetanyl group, and an onium salt is preferable. In this case, the counter anion may be any of an organic anion or an inorganic anion. Examples of the onium salt include an iodonium salt, a diazonium salt, and a sulfonium salt. Among these, a sulfonium salt and an iodonium salt are preferable, and a sulfonium salt is more preferable from the viewpoint of thermal stability. As the photocationic generator, any of those described in paragraph [0053] of JP2008-127336A can be appropriately used.

The amount of the photocationic generator to be added varies depending on the structure of the mesogenic group or spacer in the polymerizable liquid crystal compound, the oxetanyl group equivalent, the alignment conditions of liquid crystals, and the like, but is typically in a range of 100 ppm by mass to 20% by mass, preferably in a range of 1000 ppm by mass to 10% by mass, more preferably in a range of 0.2% by mass to 7% by mass, and most preferably in a range of 0.5% by mass to 5% by mass with respect to the total mass of the monomers in the liquid crystal composition.

—Other Components—

The composition used for forming the cholesteric liquid crystal layer may contain other components such as an alignment control agent and an alignment assistant other than the liquid crystal compound, the chiral agent, and the cationic initiator. As other components, known materials can be used.

—Solvent—

As a solvent of the composition for forming the cholesteric liquid crystal layer, an organic solvent is preferably used. Examples of the organic solvent include an amide (such as N,N-dimethylformamide), a sulfoxide (such as dimethyl sulfoxide), a heterocyclic compound (such as pyridine), a hydrocarbon (such as benzene or hexane), an alkyl halide (such as chloroform or dichloromethane), an ester (such as methyl acetate or butyl acetate), a ketone (such as acetone, methyl ethyl ketone, or cyclohexanone), and an ether (such as tetrahydrofuran or 1,2-dimethoxyethane). Among these, an alkyl halide and a ketone are preferable. A combination of two or more kinds of organic solvents may be used.

<Formation of Cholesteric Liquid Crystal Layer>

Figure 8:
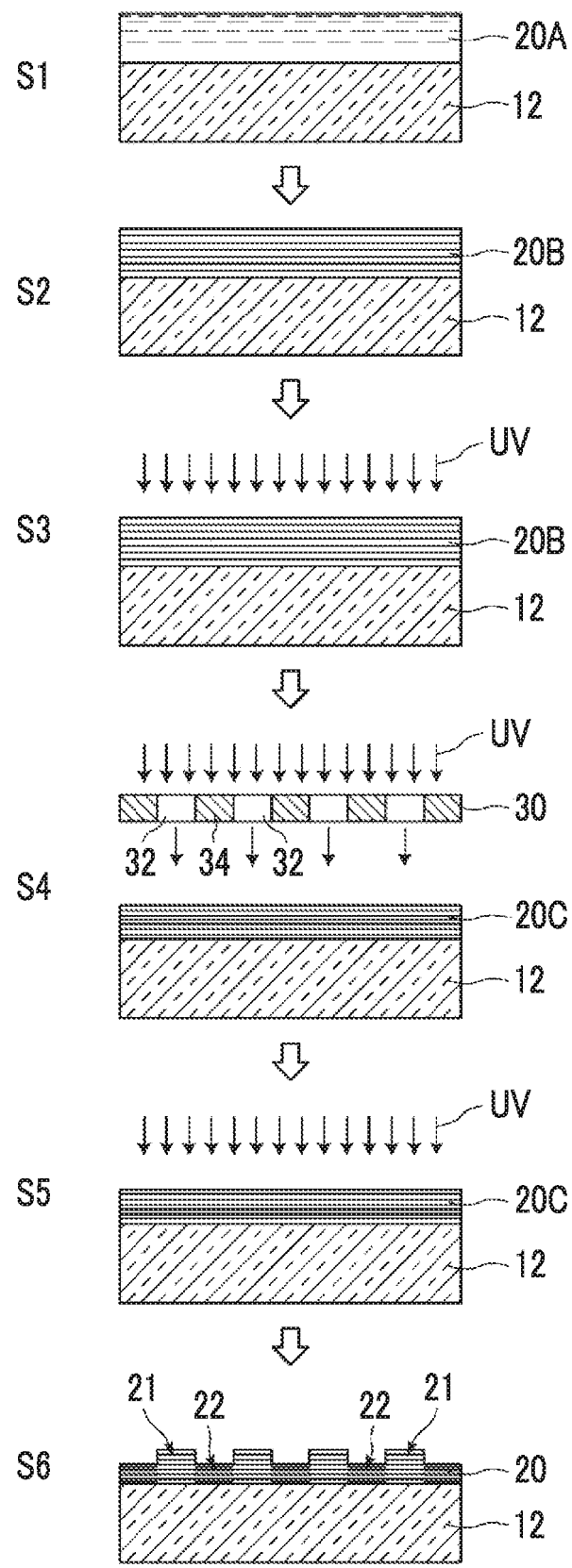
FIG. 8 is a flow view illustrating a step of forming a cholesteric liquid crystal layer.

The formation of the cholesteric liquid crystal layer will be described with reference to the step of preparing the cholesteric liquid crystal layer illustrated in FIG. 8.

<<Coating Step>>

A surface (or an alignment film provided on the support) of the support 12 is coated with the polymerizable liquid crystal composition to form a coated film 20A (S1).

The surface can be coated with the polymerizable liquid crystal composition according to a method of dissolving the polymerizable liquid crystal composition in a solvent to enter a solution state or heating the polymerizable liquid crystal composition to be turned into a liquid such as a molten liquid and then performing development using an appropriate system such as a roll coating system, a gravure printing system, and a spin coating system. The coating can be performed using various methods such as a wire bar coating method, an extrusion coating method, a direct gravure coating method, a reverse gravure coating method, and a die-coating method. Further, a coated film can be formed by jetting the liquid crystal composition from a nozzle using an ink jet device.

<<Aging Step>>

The coated film 20A is held (aged) at a temperature of forming a cholesteric phase of a liquid crystal for a certain time to align the liquid crystal in the cholesteric phase (S2). The aging temperature and the aging time may be determined according to the liquid crystal compound.

<<Ultraviolet (UV) Curing Step>>

After the aging step, ultraviolet curing for fixing the alignment state of molecules of the liquid crystal compound is performed. In the ultraviolet curing step, the polymerization reaction (photocationic polymerization reaction) using a photocationic polymerization group and the polymerization reaction (photoradical polymerization reaction) using a photoradical polymerization group are separately progressed. In the present specification, the coated film after the initial polymerization step in two-stage polymerization during the ultraviolet curing step is referred to as a liquid crystal semi-fixed film. The procedures of the curing step will be described below.

1) First Entire Surface Exposure Step

The entire surface of a coated film 20B aligned in the cholesteric phase is irradiated with ultraviolet rays with an exposure amount of 100 to 2000 mJ/cm$^2$ in air so that the entire surface of the coated film 20B is substantially uniformly exposed (S3). At this time, the cationic polymerization mainly proceeds due to the action of the cationic polymerization initiator contained in the coated film 20B. Further, the radical polymerization may partially occur. By exposing the entire surface, a liquid crystal semi-fixed film 20C which is partially crosslinked over the entire surface so that the alignment state of the liquid crystal is semi-fixed is obtained. The "semi-fixed" indicates a state in which the liquid crystal composition of the present invention has lost the fluidity and also indicates a state before the heat treatment step is performed. For example, the "semi-fixed" indicates that only a functional group on one side is crosslinked in a bifunctional liquid crystal to enter a polymer liquid crystal state. In a case of a polymerizable liquid crystal compound comprising a cationic polymerization group and a photoradical polymerization group, the "semi-fixed" indicates a state in which one of the cationic polymerization group or the photoradical polymerization group is selectively crosslinked. In the first entire surface exposure step, the "semi-fixed" indicates a state in which the cationic polymerization group is selectively crosslinked, but the photoradical polymerization group may be partially crosslinked.

2) Initiator Coating Step

The surface of the liquid crystal semi-fixed film 20C is coated with an initiator supply liquid containing a photoradical polymerization initiator and dried.

3) Mask Exposure Step

Thereafter, in a state in which a predetermined mask 30 is disposed on the liquid crystal semi-fixed film 20C, the liquid crystal semi-fixed film 20C is irradiated with ultraviolet rays with an exposure amount of 30 to 100 mJ/cm$^2$ through the predetermined mask 30 at room temperature in air (S4). The predetermined mask 30 is formed by alternately arranging opening portions 32 corresponding to the first regions and non-opening portions 34 corresponding to the second regions with a period P in order to obtain the first regions and the second regions in a desired pattern. In this manner, pattern exposure in which the region of the liquid crystal semi-fixed film 20C exposed to the opening portions 32 of the mask 30 is exposed and the portion covered with the non-opening portions 34 of the mask 30 is not exposed is performed. At this time, the photoradical polymerization proceeds due to the action of the photoradical polymerization initiator in the exposed region.

4) Second Entire Surface Exposure Step

Next, the mask 30 is peeled off, and the entire surface of the liquid crystal semi-fixed film 20C is irradiated with ultraviolet rays with an exposure amount of 30 to 100 mJ/cm$^2$ at room temperature in air so that the entire surface thereof is substantially uniformly exposed (S5). The photoradical polymerization proceeds in the entire surface due to this entire surface exposure.

The film coated with the polymerizable liquid crystal composition which is cured by each ultraviolet irradiation step described above is referred to as an ultraviolet cured film.

<<Heat Treatment Step>>

The entire substrate including the ultraviolet cured film after the ultraviolet curing step, the alignment film, and the support is subjected to a heat treatment in a temperature range of 120° C. to 300° C. for 5 to 60 minutes.

During this heat treatment, a difference in contraction rate between the film thickness of the first region and the film thickness of the second region occurs. As the result, a difference between the film thickness of the first region 21 and the film thickness of the second region 22 occurs (S6).

By performing the above-described steps, a patterned liquid crystal layer (cholesteric liquid crystal layer 20) is obtained.

In a case where the heat treatment is performed after the ultraviolet curing step, the volume contraction rate in the heat treatment step is decreased as the polymerizable liquid crystal composition used in the present production method is cured more intensely with ultraviolet rays (as the total exposure amount is increased) as described above. In other words, in the preparation step, since the exposure amount of the first region 21 corresponding to the opening portion 32 of the mask 30 is greater than the exposure amount of the second region 22 corresponding to the non-opening portion 34 of the mask 30, the contraction rate in the first region is smaller than that in the second region, and the film thickness of the first region 21 is larger than that of the second region 22. Since the contraction rate in the first region 21 is different from the contraction rate in the second region 22 while the alignment state in the initial aging step is maintained, the helical pitch in the second region 22 becomes smaller than that in the first region 21 while the number of rotations (the number of pitches) of the helix in the first region is the same as the number of rotations of the helix in the second region.

Hereinbefore, the case where the cationic polymerization group of the polymerizable liquid crystal compound containing the cationic polymerization group and the photoradical polymerization group is polymerized first and then the photoradical polymerization group is polymerized has been described, but the same cholesteric liquid crystal layer can be formed by the procedure of polymerizing the photoradical polymerization group first and then polymerizing the cationic polymerization group. In this case, as the polymerizable liquid crystal composition, a composition containing a photoradical polymerization initiator in place of a cationic polymerization initiator may be used. In addition, the photoradical polymerization initiator coating step is not necessary. Therefore, a cationic initiator coating step may be provided before the cationic polymerization is separately performed.

[Optically Isotropic Layer]

An optically isotropic layer indicates a layer that does not substantially have an optical function such as the phase difference, and known binder polymers can be appropriately used. The refractive index of the optically isotropic layer is preferably in a range of 1.4 to 1.7.

Examples of the binder polymer include an acrylic polymer containing a carboxylic acid functional group as a pendant group; and a copolymer obtained by copolymerizing at least one monomer selected from ethylenically unsaturated carboxylic acid, an ester of (meth)acrylic acid, a vinyl aromatic compound, an amide type unsaturated compound, a polyolefin type compound, methacrylonitrile, methyl isopropenyl ketone, mono-2-[(meth)acryloyloxy]ethyl succinate, N-phenyl maleimide, maleic anhydride, vinyl acetate, vinyl propionate, a vinyl pivalate polystyrene macromonomer, and a methyl poly(meth)acrylate macromonomer.

Examples of the ethylenically unsaturated carboxylic acid include (meth)acrylic acid, 2-carboxyethyl (meth)acrylic acid, 2-carboxypropyl (meth)acrylic acid, itaconic acid, crotonic acid, maleic acid, fumaric acid, and mono(meth)acrylic acid ω-carboxypolycaprolactone.

Examples of the ester of (meth)acrylic acid include methyl (meth)acrylate, ethyl (meth)acrylate, propyl (meth)acrylate, butyl (meth)acrylate, benzyl (meth)acrylate, 2-ethyl (meth)acrylate, hydroxyethyl (meth)acrylate, hydroxypropyl (meth)acrylate, glycerin mono(meth)acrylate, tricycle[5.2.1.0$^{2,6}$]decane-8-yl (meth)acrylate, glycidyl (meth)acrylate, 2-methyl glycidyl (meth)acrylate, 3,4-epoxybutyl (meth)acrylate, and 6,7-epoxyheptyl (meth)acrylate.

Examples of the vinyl aromatic compound include styrene, α-methylstyrene, vinyl toluene, p-chlorostyrene, and vinyl benzyl glycidyl ether.

Examples of the amide type unsaturated compound include (meth)acrylamide diacetone acrylamide, N-methylol acrylamide, and N-butoxy methacrylamide.

Examples of the polyolefin type compound include butadiene, isoprene, and chloroprene.

Examples of the copolymer include copolymers of (meth)acrylic acid ester or (meth)acrylic acid and styrene, substituted styrene, a phenol resin (such as a novolac resin), or (poly)hydroxystyrene; and copolymers of hydroxystyrene and at least one of alkyl acrylate, acrylic acid, or methacrylic acid.

Among these, as the copolymer, a methyl methacrylate/methacrylic acid copolymer, a benzyl methacrylate/methacrylic acid copolymer, a methyl methacrylate/ethyl acrylate/methacrylic acid copolymer, a benzyl methacrylate/methacrylic acid/styrene copolymer, a benzyl methacrylate/methacrylic acid/hydroxyethyl methacrylate copolymer, a methyl methacrylate/butyl methacrylate/methacrylic acid/styrene copolymer, or a methyl methacrylate/benzyl methacrylate/methacrylic acid/hydroxyphenyl methacrylate copolymer is particularly preferable.

Further, other examples of the binder polymer include alkyl polyalkyl methacrylate, polyalkyl acrylate, poly(benzyl methacrylate-co-hydroxyethyl methacrylate-co-methacrylic acid), and poly(benzyl methacrylate-co-methacrylic acid); cellulose ester and cellulose ether (such as cellulose acetate, cellulose acetobutyrate, methyl cellulose, or ethyl cellulose), polyvinyl butyral, polyvinyl formal, and cyclized rubber; polyether (such as polyethylene oxide, polypropylene oxide, or polytetrahydrofuran), polystyrene, polycarbonate, polyurethane, chlorinated polyolefin, polyvinyl chloride, a vinyl chloride/vinylidene copolymer, a vinylidene chloride/acrylonitrile copolymer, a methyl methacrylate/vinyl acetate copolymer, polyvinyl acetate, and an ethylene/vinyl acetate copolymer; polycaprolactam, polyhexamethylene adipinamide, polyester [such as poly(ethylene glycol terephthalate) or poly(hexamethylene glycol succinate)], and a polyimide binder resin.

Examples of the polyimide binder resin include solvent-soluble polyimide and a polyimide precursor (such as polyamic acid)

[Support]

As the support, a transparent support is preferable, and examples thereof include a polyacrylic resin film such as polymethyl methacrylate, a cellulose-based resin film such as cellulose triacetate, and a cycloolefin polymer-based resin [such as "ARTON" (trade name, manufactured by JSR Corporation) or "ZEONOR" (trade name, manufactured by Zeon Corporation)]. The support is not limited to a flexible film, and an inflexible substrate such as a glass substrate may be used.

Further, the optical film according to the embodiment of the present invention may be used while being supported by the support at the time of film formation, and the support at the time of film formation is set as a temporary support and may be used by being transferred to another support and peeling off the temporary support.

[Alignment Film]

An alignment film may be comprised on the support for forming the cholesteric liquid crystal layer. The alignment film can be provided by means of a rubbing treatment performed on an organic compound (preferably a polymer), oblique vapor deposition of an inorganic compound, and formation of a layer having microgrooves. Further, an alignment film which is allowed to have an alignment function by imparting an electric field, imparting a magnetic field, or performing irradiation with light has been known. It is preferable that the alignment film is formed by performing a rubbing treatment on a surface of a polymer film. In a case where the optical film is used by being peeled off from the support used at the time of film formation, it is preferable that the alignment film is peeled off together with the support.

In a case of a support made of a resin is used, the support can function as the alignment film by performing the alignment treatment directly on the support (for example, a rubbing treatment) without providing the alignment film depending on the kind of the polymer. Examples of such a support include polyethylene terephthalate (PET).

[Diffusion Plate]

As a diffusion plate, any diffusion plate may be used without particular limitation as long as the steepness of the angle of reflected light can be alleviated, but a diffusion plate whose back scattering is small is preferable.

For example, in a case where the turbidity of the film is converted to a haze value, the haze value is preferably in a range of 30% to 95%. The haze value can be measured using a haze meter NDH5000 (manufactured by Nippon Denshoku Industries Co., Ltd.).

[Adhesive Layer (Pressure Sensitive Adhesive Layer)]

In the present specification, the concept of "adhesion" includes "pressure sensitive adhesion".

In a case where a reflective polarizer and an absolute phase adjustment layer are laminated on each other, a plurality of optical laminators are laminated, or a diffusion plate is laminated on an absolute phase adjustment layer, the lamination may be carried out through an adhesive layer.

Examples of the pressure sensitive adhesive used for an adhesive layer include a polyester-based resin, an epoxy-based resin, a polyurethane-based resin, a silicone-based resin, and an acrylic resin. These may be used alone or in the form of a mixture of two or more kinds thereof. From the viewpoint that the water resistance, the heat resistance, and the light fastness are reliable and excellent, the adhesiveness and the transparency are excellent, and the refractive index is easily adjusted to be suitable for a liquid crystal display, the acrylic resin is preferable.

EXAMPLES

Hereinafter, examples and comparative examples of the optical film according to the embodiment of the present invention will be described.

First, preparation of various compositions used for preparing the optical films of the examples and the comparative examples will be described.

(Preparation of Alignment Film Composition B)

<Synthesis of Polymer for Alignment Film Composition>

A reaction container provided with a stirrer, a thermometer, a dropping funnel, and a reflux cooling tube is charged with 100 parts by mass of 2-(3,4-epoxycyclohexyl)ethyltrimethoxysilane, 500 parts by mass of methyl isobutyl ketone, and 10 parts by mass of trimethylamine, and the mixture was mixed at room temperature.

Next, 100 parts by mass of deionized water was added dropwise to the solution in the reaction container for 30 minutes using the dropping funnel, and the obtained solution was allowed to react at 80° C. for 6 hours while being mixed under reflux. After completion of the reaction, an organic phase was taken out from the solution, and the organic phase was washed until water after the organic phase was washed with a 0.2 mass % ammonium nitrate aqueous solution became neutral. Thereafter, the solvent and water were distilled off under reduced pressure, thereby obtaining epoxy group-containing polyorganosiloxane in the form of a viscous and transparent liquid.

The nuclear magnetic resonance ($^1$H-NMR) evaluation was performed on the epoxy group-containing polyorganosiloxane. As the result, it was confirmed that a peak based on an oxiranyl group was obtained around a chemical shift ($\delta$) of 3.2 ppm according to the theoretical strength, and side reactions of the epoxy group did not occur during the reaction. The weight-average molecular weight Mw of the epoxy group-containing polyorganosiloxane was 2200 and the epoxy equivalent thereof was 186 g/mol.

Next, a 100 mL three-neck flask was charged with 10.1 parts by mass of the epoxy group-containing polyorganosiloxane obtained in the above-described manner, 0.5 parts by mass of acrylic group-containing carboxylic acid ("ARONIX M-5300" (trade name), manufactured by Toagosei Co., Ltd., acrylic acid ω-carboxypolycaprolactone (polymerization degree n≅2)), 20 parts by mass of butyl acetate, 1.5 parts by mass of a cinnamic acid derivative obtained by the method of Synthesis Example 1 of JP2015-026050A, and 0.3 parts by mass of tetrabutylammonium bromide, and the obtained reaction solution was stirred at 90° C. for 12 hours.

After the reaction, the reaction solution was diluted with butyl acetate whose amount (mass) was set to be the same as the amount of the reaction solution, and the resulting solution was washed with water three times.

An operation of concentration the obtained solution and diluting the solution with butyl acetate was repeated twice to finally obtain a solution containing polyorganosiloxane (polymer) having a photoalignment group. The weight-average molecular weight Mw of the polymer was 9000. Further, as the result of $^1$H-NMR, the content of the component containing a cinnamate group in the polymer was 23.7% by mass.

<Preparation of Alignment Film Composition B>

The polymer prepared in the above-described manner and the following compounds D1 and D2 were added using butyl acetate as a solvent, thereby preparing an alignment film composition B.

| Alignment film composition B | |
|---|---|
| | (parts by mass) |
| Butyl acetate | 100 |
| Polymer for alignment film composition | 4.35 |

| Alignment film composition B | |
|---|---|
| | (parts by mass) |
| Compound D1 | 0.48 |
| Compound D2 | 1.15 |

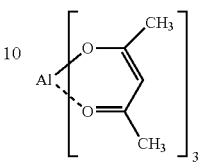

D1

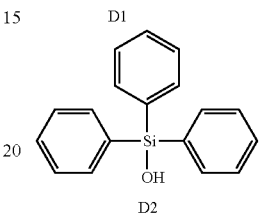

D2

(Preparation of Polymerizable Liquid Crystal Composition LC-2)

After the following composition was prepared, the composition was filtered by a polypropylene filter having a pore diameter of 0.2 μm and used as a composition LC-2 for an optically anisotropic layer.

LC-1-1 was synthesized based on the method described in JP2004-012382A. LC-1-1 is a liquid crystal compound having two reactive groups. One of two reactive groups is an acrylic group which is a radically reactive group, and the other is an oxetane group which is a cationic reactive group. LC-1-2 was synthesized in conformity with the method described in Tetrahedron Letters Vol. 43, p. 6793 (202).

| Polymerizable liquid crystal composition LC-2 | |
|---|---|
| | (parts by mass) |
| Rod-like liquid crystal (LC-1-1) | 19.57 |
| Horizontal alignment agent (LC-1-2) | 0.01 |
| Chiral agent with the following structure | 1.14 |
| Cationic monomer (OXT-121, manufactured by Toagosei Co., Ltd.) | 0.98 |
| Cationic polymerization initiator (Curacure UVI6974, manufactured by The Dow Chemical Company) | 0.4 |
| Polymerization control agent (IRGANOX1076, manufactured by BASF SE) | 0.02 |
| Methyl ethyl ketone | 80.0 |

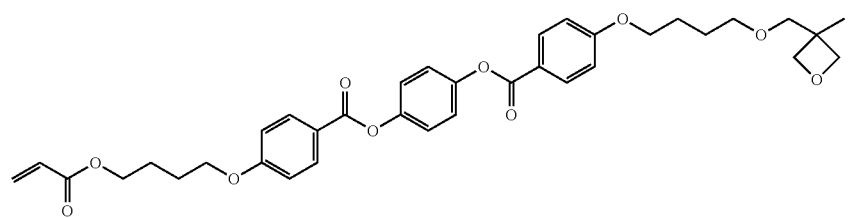

(LC-1-1)

| Polymerizable liquid crystal composition LC-2 |
| --- |
| (parts by mass) |

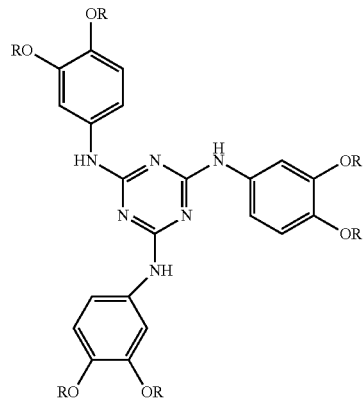

R = CH$_2$CH$_2$OCH$_2$CH$_2$C$_6$F$_{13}$ (LC-1-2)

Chiral agent

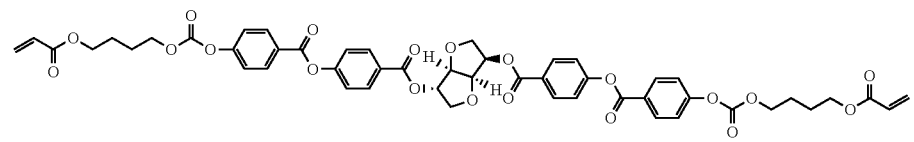

(Preparation of Initiator Supply Liquid AD-1)

After the following composition was prepared, the composition was filtered by a polypropylene filter having a pore diameter of 0.2 μm and used as an initiator supply liquid AD-1.

| Initiator supply liquid AD-1 (parts by mass) | |
| --- | --- |
| Photoradical polymerization initiator (2-trichloromethyl-5-(p-styrylstyryl)1,3,4-oxadiazole | 0.12 |
| Hydroquinone monomethyl ether | 0.002 |
| MEGAFACE F-176PF (manufactured by Dainippon Ink & Chemicals Inc.) | 0.05 |
| Propylene glycol monomethyl ether acetate | 34.80 |
| Methyl ethyl ketone | 50.538 |
| Methanol | 1.61 |

(Preparation of Isotropic Layer Composition I-1)

After the following composition was prepared, the composition was filtered by a polypropylene filter having a pore diameter of 0.2 μm and used as an isotropic layer composition.

| Isotropic layer composition I-1 (parts by mass) | |
| --- | --- |
| Random copolymer of benzyl methacrylate/methacrylic acid/methyl methacrylate at a molar ratio of 35.9/22.4/41.7 (weight-average molecular weight of 38000) | 8.05 |
| Photoradical polymerization initiator (2-trichloromethyl-5-(p-styrylstyryl) 1,3,4-oxadiazole) | 0.12 |
| Hydroquinone monomethyl ether | 0.002 |
| MEGAFACE F-176PF (manufactured by Dainippon Ink & Chemicals Inc.) | 0.05 |
| Propylene glycol monomethyl ether acetate | 34.80 |
| Methyl ethyl ketone | 50.538 |
| Methanol | 1.61 |

Example 1

An optical film of Example 1 was prepared according to the following procedures.

<Formation of Alignment Film>

A glass substrate was uniformly coated with the alignment film composition B prepared in the above-described manner using a slit coater and dried in an oven at 100° C. for 2 minutes, thereby obtaining a glass substrate provided with an alignment film having a film thickness of 0.5 μm. This alignment film was subjected to a rubbing treatment in a direction parallel to the coating direction.

<Formation of Cholesteric Liquid Crystal Layer>

The surface of the alignment film which had been subjected to the rubbing treatment was coated with the polymerizable liquid crystal composition LC-2 to form a coated film (coating step).

Next, the coated film was heated at a film surface temperature of 80° C. for 60 seconds and aged, and the liquid crystal was aligned in the cholesteric phase (aging step).

Thereafter, the entire surface of the coated film was immediately irradiated with ultraviolet rays with an exposure amount of 500 mJ/cm$^2$ so that the entire surface thereof was exposed (ultraviolet curing step: first entire surface exposure step) using an air-cooled metal halide lamp (manufactured by Eye Graphics Co., Ltd.) at a film surface temperature of 70° C. in air, photocationic polymerization was allowed to proceed, and the alignment state thereof was semi-fixed, thereby forming a liquid crystal semi-fixed film.

The liquid crystal semi-fixed film obtained in the above-described manner was coated with the initiator supply liquid AD-1 prepared in the above-described manner and dried at 80° C. for 60 seconds (ultraviolet curing step: initiator coating step).

Thereafter, the obtained film was irradiated with ultraviolet rays at an exposure amount of 25 mJ/cm$^2$ through a predetermined mask so as to be exposed at 25° C. in air using an exposure device PLA-501F (ultrahigh pressure mercury lamp, manufactured by Canon Inc.) (ultraviolet curing step: mask exposure step), and photoradical polymerization was allowed to proceed in the exposure region. The predetermined mask was formed such that opening portions and non-opening portions are alternately arranged in a stripe shape with a period of P listed in Table 1 shown below.

Further, the mask was peeled off, the entire surface was exposed at an exposure amount of 25 mJ/cm$^2$ using an exposure device PLA-501F (ultrahigh pressure mercury lamp, manufactured by Canon Inc.) at 25° C. in air (ultraviolet curing step: second entire surface exposure step), and photoradical polymerization was allowed to proceed over the entire surface.

Thereafter, the entire substrate including an ultraviolet cured film was baked in an oven at 200° C. for 30 minutes (heat treatment step) to obtain a patterned liquid crystal layer (a cholesteric liquid crystal layer having an uneven surface). The reflection center wavelength of the cholesteric liquid crystal layer was 550 nm.

In the obtained cholesteric liquid crystal layer, the film thickness of the exposed first region corresponding to the opening portion of the mask at the time of mask exposure was 4.26 µm. Meanwhile, the film thickness of the unexposed second region corresponding to the non-opening portion of the mask at the time mask exposure was 3.83 µm. In other words, as the total exposure amount was increased, the film thickness of the region was increased. In addition, the width $w_1$ of the first region, the width $w_2$ of the second region, the helical pitches $p_1$ and $p_2$ of the first and second regions, and the arrangement period P are listed in Table 1.

The film thickness, the width, and the arrangement period of each region were acquired from a scanning electron microscope (SEM) image of a cross section of the first region and the second region along the arrangement direction by cutting the cross section of the obtained cholesteric liquid crystal layer.

The film thickness $d_1$ of the first region indicates the distance from the interface between the cholesteric liquid crystal layer and the alignment film corresponding to the lower layer of the cholesteric liquid crystal layer to the vertex of a projection. The film thickness $d_2$ of the second region indicates a distance from an interface between the cholesteric liquid crystal layer and the alignment film to the most depressed position of a depression. The film thickness is acquired by measuring a plurality of three or more sites and averaging the values.

The width $w_1$ of the first region and the width $w_2$ of the second region are each set as the distance between intersections of the film thickness line of $(d_1+d_2)/2$ with side walls of a projection (see FIG. 3). Further, the period P indicates $w_1+w_2$.

Further, the period, that is, the helical pitch of the cholesteric liquid crystal can be acquired from the intensity of the SEM image. In the SEM image, since "dark→bright→dark→bright→dark" corresponds to 360 degrees, the length thereof is measured as the helical pitch.

<Formation of Isotropic Layer>

After the preparation of the cholesteric liquid crystal layer, the uneven surface thereof was coated with the isotropic layer composition such that the dried film thickness from a depression of the uneven surface to the top of the surface was set to approximately 2 µm, and the composition was cured to form an isotropic layer. It was confirmed that a difference between the film thickness of the first region and the film thickness of the second region was eliminated due to this isotropic layer and the surface of the isotropic layer became flat.

In the manner described above, the optical film of Example 1 was prepared.

Examples 2 to 5

Each of optical films of Examples 2 to 5 was prepared by forming an alignment film on a glass substrate to form a cholesteric liquid crystal layer and forming an isotropic layer according to the same procedures as those in the preparation method of Example 1. Here, in the step of forming the cholesteric liquid crystal layer, each of the optical films of Examples 2 to 5 was prepared by adjusting the thickness of the coated film of the polymerizable liquid crystal composition LC-2, the pitch of the mask, and/or the ultraviolet exposure amount such that the arrangement period P and the film thickness $d_1$ and $d_2$ of the first region and the second region were set to the values listed in Table 1. Further, the exposure amount at the time of mask exposure was set to 15 mJ in Example 4 and to 35 mJ in Example 5. The film thickness, the width, the helical pitch, and the arrangement period of the first region and the second region of the cholesteric liquid crystal layer in the obtained optical film are as listed in Table 1.

Example 6

An alignment film was formed on the glass substrate according to the same procedures as those in the preparation method of Example 1 to form a cholesteric liquid crystal layer. Here, an isotropic layer was not provided, and an optical film whose surface was an uneven surface of the cholesteric liquid crystal layer was obtained in Example 6.

Comparative Example 1

An optical film of Comparative Example 2 was prepared according to the same procedures as those in the preparation method of Example 1 except that the mask exposure step was changed to the entire surface exposure step without using a mask. The irradiation amount was set to be the same as in the case of the mask exposure of Example 1. In other words, in the present example, the total ultraviolet exposure amount for the liquid crystal semi-fixed film was set to be uniform over the entire surface. Therefore, the film thickness of the formed cholesteric liquid crystal layer was approximately uniform over the entire region, and the value was 4.26 µm.

Comparative Example 2

An optical film comprising a cholesteric liquid crystal layer that comprised a first region and a second region having different film thicknesses but having the same helical pitch was prepared in Comparative Example 2. The optical film of Comparative Example 2 was prepared according to the following procedures.

<Formation of Alignment Film>

A glass subuetrate with a one-dimensional uneven pattern in which the pitch was 0.75 µm and the difference in unevenness was 0.43 µm was prepared. The glass substrate was uniformly coated with the alignment film composition B using a slit coater and dried in an oven at 100° C. for 2 minutes, thereby obtaining a glass substrate provided with an alignment film. At this time, the difference in unevenness between the projection and the depression of the substrate was maintained to 0.43 µm.

This alignment film was subjected to a rubbing treatment in a direction parallel to the longitudinal direction of the uneven pattern.

<Formation of Cholesteric Liquid Crystal Layer>

The surface of the alignment film which had been subjected to the rubbing treatment was coated with the polymerizable liquid crystal composition LC-2 to form a coated film (coating step).

Next, the coated film was heated at a film surface temperature of 80° C. for 60 seconds and aged, and the liquid crystal was aligned in the cholesteric phase (aging step).

Thereafter, the entire surface of the coated film was immediately irradiated with ultraviolet rays with an exposure amount of 500 mJ/cm$^2$ so that the entire surface thereof was exposed (ultraviolet curing step: first entire surface exposure step) using an air-cooled metal halide lamp (manufactured by Eye Graphics Co., Ltd.) at a film surface temperature of 70° C. in air, photocationic polymerization was allowed to proceed, and the alignment state thereof was semi-fixed, thereby forming a liquid crystal semi-fixed film.

The liquid crystal semi-fixed film obtained in the above-described manner was coated with the initiator supply liquid AD-1 prepared in the above-described manner and dried at 80° C. for 60 seconds (ultraviolet curing step: radical polymerization initiator coating step).

Thereafter, the entire surface of the obtained film was exposed (ultraviolet curing step: second entire surface exposure step) at an exposure amount of 50 mJ/cm$^2$ at 25° C. in air using an exposure device PLA-501F (ultrahigh pressure mercury lamp, manufactured by Canon Inc.), and photoradical polymerization was allowed to proceed in the entire surface.

Thereafter, the ultraviolet cured film was transferred to another glass plate. By transferring the ultraviolet cured film, the uneven surface of the ultraviolet cured film became a surface.

Thereafter, the entire substrate was baked in an oven at 200° C. for 30 minutes (heat treatment step) to obtain a patterned liquid crystal layer (a cholesteric liquid crystal layer having an uneven surface).

The obtained cholesteric liquid crystal layer was formed in an uneven pattern having a first region with a film thickness of 4.26 µm and a second region with a film thickness of 3.83 µm. Further, the helical pitches of the first region with a film thickness of 4.26 µm and the second region with a film thickness of 3.83 µm were both 344 nm. In addition, the width $w_1$ of the first region, the width $w_2$ of the second region, and the arrangement period P are listed in Table 1.

<Formation of Isotropic Layer>

Thereafter, in the same manner as in Example 1, the uneven surface of the cholesteric liquid crystal layer was coated with the isotropic layer composition such that the dried film thickness from a depression of the uneven surface to the top of the surface was set to approximately 2 µm, and the composition was cured to form an isotropic layer. It was confirmed that a difference between the film thickness of the first region and the film thickness of the second region was eliminated due to this isotropic layer and the surface of the isotropic layer became flat.

In the manner described above, the optical film of Comparative Example 2 was prepared.

[Evaluation]

In each optical film, the chromaticities of integrated reflected light in the normal direction (polar angle of 0°) with respect to the surface and in a direction (polar angle of 45°) inclined from the normal direction by 45° were respectively measured from the surface side (the uneven surface side of the cholesteric liquid crystal layer) thereof. A difference in chromaticity (Δu'v') was acquired based on the measured value at a wavelength of 380 to 780 nm in the normal direction and the measured value in the direction inclined from the normal direction by 45°. As the measuring device, an ultraviolet-visible near infrared spectrophotometer V-700 (manufactured by Jasco Corporation) was used.

The difference in chromaticity was evaluated based on the following criteria. In addition, A indicates that the evaluation result is most preferable, A to C indicate that the evaluation results are in an acceptable range, and D and E indicate that the evaluation results of the chromaticity are not acceptable.

A: 0.2 or less
B: greater than 0.2 and less than or equal to 0.3
C: greater than 0.3 and less than or equal to 0.4
D: greater than 0.4 and less than or equal to 0.5
E: greater than 0.5

The configuration and the evaluation result of each example are collectively listed in Table 1.

TABLE 1

| | | | | Comparative Example 1 | Comparative Example 2 | Example 1 | Example 2 | Example 3 | Example 4 | Example 5 | Example 6 |
|---|---|---|---|---|---|---|---|---|---|---|---|
| Configuration of optical film | Alignment film (uniform alignment in plane) | | | Available | Available | Available | Available | Available | Available | Available | Available |
| | Cholesteric layer | First region | Film thickness $d_1$ (µm) | 4.26 | 4.26 | 4.26 | 4.26 | 4.26 | 4.26 | 4.26 | 4.26 |
| | | | Width $w_1$ (µm) | — | 0.375 | 0.375 | 0.25 | 1 | 0.375 | 0.375 | 0.375 |
| | | | Helical pitch $P_1$ (nm) | 344 | 344 | 344 | 344 | 344 | 344 | 344 | 344 |
| | | Second region | Film thickness $d_2$ (µm) | — | 3.83 | 3.83 | 3.83 | 3.83 | 3.41 | 4.05 | 3.83 |
| | | | Width $w_2$ (µm) | — | 0.375 | 0.375 | 0.25 | 1 | 0.375 | 0.375 | 0.375 |
| | | | Helical pitch $P_2$ (nm) | — | 344 | 310 | 310 | 310 | 275 | 327 | 310 |
| | | Period P = $w_1 + w_2$ (µm) | | — | 0.75 | 0.75 | 0.5 | 2 | 0.75 | 0.75 | 0.75 |
| | | Difference in film thickness $d_1 - d_2$ (µm) | | — | 0.43 | 0.43 | 0.43 | 0.43 | 0.85 | 0.21 | 0.43 |
| | Refractive index of optically isotropic layer | | | — | 1.6 | 1.6 | 1.6 | 1.6 | 1.6 | 1.6 | — |
| Effect | Evaluation of difference in chromaticity (Δu'v') of integrated reflected light at polar angle of 0° and polar angle of 45° | | | E | D | A | B | B | B | B | B |

As listed in Table 1, the difference in chromaticity in Comparative Example 1 was unacceptably large. In a case where the difference in film thickness was only comprised as in Comparative Example 2, the difference in chromatography tends to be suppressed. However, in Examples 1 to 6, it was clarified that the difference in chromaticity was sufficiently small, and a change in color depending on the viewing angle was suppressed.

EXPLANATION OF REFERENCES 10, 110: optical film
10A: surface of optical film
12: support
20: cholesteric liquid crystal layer
20A: coated film
20B: coated film in which liquid crystal layer is aligned in cholesteric phase
20C: liquid crystal semi-fixed film
21: first region
22: second region
24: alignment film
28: diffusion plate

What is claimed is:

1. An optical film comprising:
a cholesteric liquid crystal layer,
wherein the cholesteric liquid crystal layer is formed such that first regions having a first film thickness and second regions having a second film thickness which is smaller than the first film thickness are alternately arranged with a period P of 0.5 µm to 2.0 µm in at least one direction in a plane,
a difference in film thickness between the first film thickness and the second film thickness is in a range of 0.2 µm to 1.0 µm, and
a helical pitch of a cholesteric liquid crystal in the first region is different from a helical pitch of a cholesteric liquid crystal in the second region.

2. The optical film according to claim 1,
wherein, in a case where the helical pitch in the first region is set as $p_1$ and the helical pitch in the second region is set as $p_2$, $p_1$ and $p_2$ have a relationship of $p_1 \times 0.80 \leq p_2 \leq p_1 \times 0.95$.

3. The optical film according to claim 1,
wherein each of widths of the first region and the second region in the one direction is half the period P.

4. The optical film according to claim 1,
wherein the number of rotations of the helix of the cholesteric liquid crystal in the first region is the same as the number of rotations of the helix of the cholesteric liquid crystal in the second region.

5. The optical film according to claim 1,
wherein the cholesteric liquid crystals in the first region and the second region are formed of the same material.

6. The optical film according to claim 1, further comprising:
an optically isotropic layer provided on an uneven surface of the cholesteric liquid crystal layer which is generated due to the difference in film thickness between the first region and the second region.

7. The optical film according to claim 6,
wherein a refractive index of the optically isotropic layer is in a range of 1.4 to 1.7.

8. The optical film according to claim 1,
wherein the first regions and the second regions have the same stripe shape and are alternately arranged in a width direction of the stripe shape.

9. The optical film according to claim 1,
wherein the first regions and the second regions have the same rectangular shape and are alternately arranged vertically and horizontally.

10. A method of producing the optical film according to claim 1, which forms a cholesteric liquid crystal layer including first regions having a first film thickness that correspond to opening portions of a mask and second regions having a second film thickness smaller than the first film thickness that correspond to non-opening portions, the method comprising:
a coating step of uniformly coating a support with a polymerizable liquid crystal composition which contains a polymerizable liquid crystal compound containing a cationic polymerization group and a photoradical polymerization group, a chiral agent, and a cationic polymerization initiator to form a coated film;
an aging step of aligning a liquid crystal in a cholesteric phase in the coated film;
a first entire surface exposure step of irradiating an entire surface of the coated film aligned in the cholesteric phase with ultraviolet rays to cause a photocationic polymerization reaction, and curing a part of the coated film to obtain a liquid crystal semi-fixed film;
an initiator coating step of coating a surface of the liquid crystal semi-fixed film with an initiator supply liquid containing a photoradical polymerization initiator;
a mask exposure step of irradiating the liquid crystal semi-fixed film with ultraviolet rays through a mask having non-opening portions and opening portions which are alternately arranged in at least one direction in a plane with a period P of 0.5 µm to 2.0 µm in a state in which the mask is positioned on the liquid crystal semi-fixed film;
a second entire surface exposure step of peeling off the mask from the liquid crystal semi-fixed film and irradiating an entire surface of the liquid crystal semi-fixed film with ultraviolet rays to form an ultraviolet cured film; and
a heat treatment step of performing a heat treatment on the ultraviolet cured film.

11. The method of producing the optical film according to claim 10,
wherein the polymerizable liquid crystal composition contains a polymerizable liquid crystal compound represented by Formula (1), $$Q\text{-}Sp^1\text{-}L^1\text{-}M^1\text{-}L^2\text{-}Sp^2\text{-}Ox \qquad (1)$$

in Formula (1), Q represents a polymerizable group; any one of $Sp^1$ or $Sp^2$ represents branched alkylene or alkylene containing at least one divalent linking group selected from the group consisting of —O—, —C≡C—, and —S— in a chain, and the other represents linear alkylene; $L^1$ and $L^2$ each independently represent a divalent linking group; $M^1$ represents a mesogenic group containing at least one divalent group selected from the group consisting of divalent groups represented by Formulae (2-1) to (2-12); and Ox represents a group represented by Formula (3),

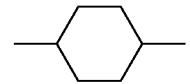

(2-1)

-continued
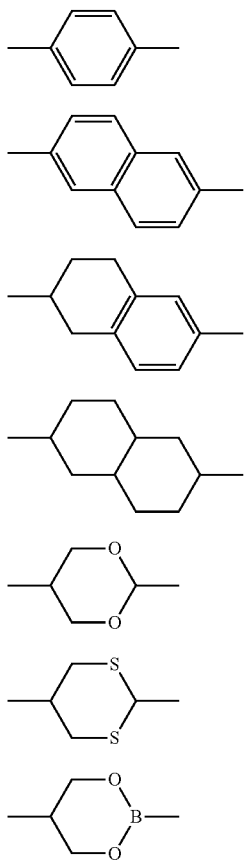
(2-2)
(2-3)
(2-4)
(2-5)
(2-6)
(2-7)
(2-8)
-continued
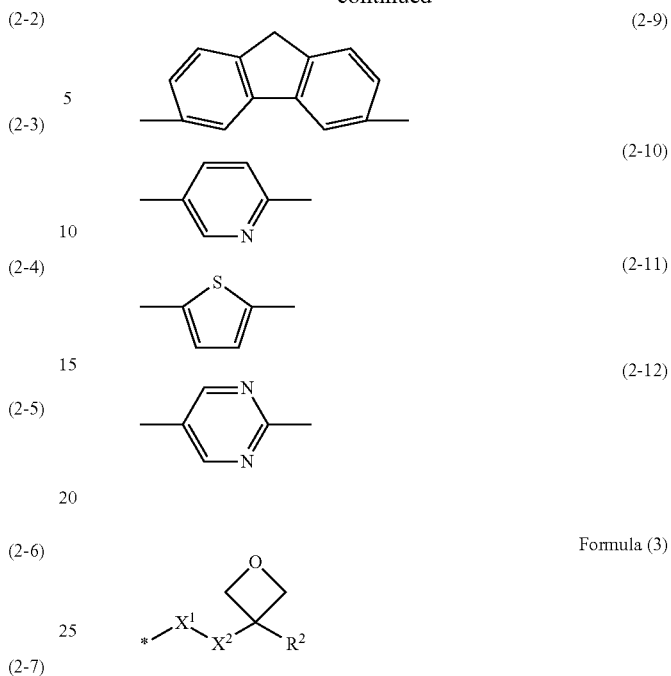
(2-9)
(2-10)
(2-11)
(2-12)
Formula (3)
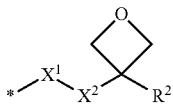
in Formula (3), $R^2$ represents a hydrogen atom, a methyl group, or an ethyl group, $X^1$ represents —O—, —S—, —OCO—, or —COO—, $X^2$ represents a single bond or alkylene having 1 to 4 carbon atoms, and the symbol "*" represents a bonding site with respect to $Sp^2$.
* * * * *